US008638016B2

(12) United States Patent
Fullerton et al.

(10) Patent No.: US 8,638,016 B2
(45) Date of Patent: Jan. 28, 2014

(54) ELECTROMAGNETIC STRUCTURE HAVING A CORE ELEMENT THAT EXTENDS MAGNETIC COUPLING AROUND OPPOSING SURFACES OF A CIRCULAR MAGNETIC STRUCTURE

(75) Inventors: Larry W. Fullerton, New Hope, AL (US); Mark D. Roberts, Huntsville, AL (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 199 days.

(21) Appl. No.: 13/236,413

(22) Filed: Sep. 19, 2011

(65) Prior Publication Data

US 2012/0091847 A1 Apr. 19, 2012

Related U.S. Application Data

(60) Provisional application No. 61/455,820, filed on Oct. 27, 2010, provisional application No. 61/455,337, filed on Oct. 19, 2010, provisional application No. 61/400,995, filed on Sep. 17, 2010.

(51) Int. Cl.
*H02K 21/12* (2006.01)

(52) U.S. Cl.
USPC ................................ 310/156.35; 310/156.43

(58) Field of Classification Search
USPC ................................ 310/156.35–156.45, 268
See application file for complete search history.

(56) References Cited

U.S. PATENT DOCUMENTS 381,968 A 5/1888 Tesla
493,858 A 3/1893 Edison
687,292 A 11/1901 Armstrong
996,933 A 7/1911 Lindquist
1,171,351 A 2/1916 Neuland
1,236,234 A 8/1917 Troje (Continued)

FOREIGN PATENT DOCUMENTS

CN 1615573 A 5/2005
DE 2938782 A1 4/1981

(Continued)

OTHER PUBLICATIONS

Series BNS, Compatible Series AES Safety Controllers, http://www.schmersalusa.com/safety_controllers/drawings/aes.pdf, pp. 159-175, date unknown.

(Continued)

*Primary Examiner* — Thanh Lam
(74) *Attorney, Agent, or Firm* — Venable LLP; Robert S. Babayi

(57) ABSTRACT

An electromagnetic structure comprises a rotor assembly having at least one circular magnetic structure. The structure has opposing first and second surfaces that extend around a peripheral boundary region. A plurality of emission regions are disposed along said peripheral boundary region, with each emission region presenting poles having opposite polarities of a first polarity and a second polarity on the opposing first and second surfaces of the circular magnetic structure. Adjacent emission regions have alternating pole orientations such that each emission source having the first polarity is between two emission sources having the second polarity and each emission source having the second polarity is between two emission sources having the first polarity. A rotational element rotates the at least one circular magnetic structure about a rotation axis that is perpendicular to the opposing first and second surfaces.

10 Claims, 28 Drawing Sheets

(56) References Cited

U.S. PATENT DOCUMENTS 2,243,555 A 5/1941 Faus
2,389,298 A 11/1945 Ellis
2,438,231 A 3/1948 Shultz
2,471,634 A 5/1949 Vennice
2,570,625 A 10/1951 Zimmerman et al.
2,722,617 A 11/1955 Cluwen et al.
3,055,999 A 9/1962 Lucas
3,102,314 A 9/1963 Alderfer
3,208,296 A 9/1965 Baermann
3,238,399 A 3/1966 Johanees et al.
3,288,511 A 11/1966 Tavano
3,301,091 A 1/1967 Reese
3,382,386 A 5/1968 Schlaeppi
3,408,104 A 10/1968 Raynes
2,932,545 A 4/1969 Foley
3,468,576 A 9/1969 Beyer et al.
3,474,366 A 10/1969 Barney
3,521,216 A 7/1970 Tolegian
3,645,650 A 2/1972 Laing
3,668,670 A 6/1972 Andersen
3,684,992 A 8/1972 Huguet et al.
3,696,258 A 10/1972 Anderson et al.
3,790,197 A 2/1974 Parker
3,791,309 A 2/1974 Baermann
3,802,034 A 4/1974 Bookless
3,803,433 A * 4/1974 Ingenito .................. 310/156.35
3,808,577 A 4/1974 Mathauser
3,845,430 A 10/1974 Petkewicz et al.
3,893,059 A 7/1975 Nowak
4,079,558 A 3/1978 Forham
4,117,431 A 9/1978 Eicher
4,129,846 A 12/1978 Yablochnikov
4,209,905 A 7/1980 Gillings
4,222,489 A 9/1980 Hutter
4,296,394 A 10/1981 Ragheb
4,352,960 A 10/1982 Dormer et al.
4,355,236 A 10/1982 Holsinger
4,399,595 A 8/1983 Yoon et al.
4,416,127 A 11/1983 Gomez-Olea Naveda
4,453,294 A 6/1984 Morita
4,535,278 A 8/1985 Asakawa
4,547,756 A 10/1985 Miller et al.
4,629,131 A 12/1986 Podell
4,645,283 A 2/1987 MacDonald et al.
4,680,494 A * 7/1987 Grosjean .................. 310/156.35
4,764,743 A 8/1988 Leupold et al.
4,837,539 A 6/1989 Baker
4,849,749 A 7/1989 Fukamachi et al.
4,862,128 A 8/1989 Leupold
H693 H 10/1989 Leupold
4,893,103 A 1/1990 Leupold
4,912,727 A 3/1990 Schubert
4,941,236 A 7/1990 Sherman et al.
4,956,625 A 9/1990 Cardone et al.
4,993,950 A 2/1991 Mensor, Jr.
4,994,778 A 2/1991 Leupold
4,996,457 A * 2/1991 Hawsey et al. ............... 310/268
5,013,949 A 5/1991 Mabe, Jr.
5,020,625 A 6/1991 Yamauchi et al.
5,050,276 A 9/1991 Pemberton
5,062,855 A 11/1991 Rincoe
5,123,843 A 6/1992 Van der Zel et al.
5,179,307 A * 1/1993 Porter ......................... 310/68 B
5,213,307 A 5/1993 Perrillat-Amede
5,302,929 A 4/1994 Kovacs
5,309,680 A 5/1994 Kiel
5,345,207 A 9/1994 Gebele
5,367,891 A 11/1994 Furuyama
5,383,049 A 1/1995 Carr
5,838,304 A 1/1995 Car
5,394,132 A 2/1995 Poil
5,399,933 A 3/1995 Tsai
5,425,763 A 6/1995 Stemmann
5,440,997 A 8/1995 Crowley
5,461,386 A 10/1995 Knebelkamp
5,492,572 A 2/1996 Schroeder et al.
5,495,221 A 2/1996 Post
5,512,732 A 4/1996 Yagnik et al.
5,570,084 A 10/1996 Ritter et al.
5,582,522 A 12/1996 Johnson
5,604,960 A 2/1997 Good
5,631,093 A 5/1997 Perry et al.
5,631,618 A 5/1997 Trumper et al.
5,633,555 A 5/1997 Ackermann et al.
5,635,889 A 6/1997 Stelter
5,637,972 A 6/1997 Randall et al.
5,730,155 A 3/1998 Allen
5,759,054 A 6/1998 Spadafore
5,788,493 A 8/1998 Tanaka et al.
5,852,393 A 12/1998 Reznik et al.
5,935,155 A 8/1999 Humayun et al.
5,956,778 A 9/1999 Godoy
5,983,406 A 11/1999 Meyerrose
6,039,759 A 3/2000 Carpentier et al.
6,047,456 A 4/2000 Yao et al.
6,072,251 A 6/2000 Markle
6,074,420 A 6/2000 Eaton
6,115,849 A 9/2000 Meyerrose
6,118,271 A 9/2000 Ely et al.
6,120,283 A 9/2000 Cousins
6,142,779 A 11/2000 Siegel et al.
6,170,131 B1 1/2001 Shin
6,187,041 B1 2/2001 Garonzik
6,205,012 B1 3/2001 Lear
6,210,033 B1 4/2001 Karkos, Jr. et al.
6,224,374 B1 5/2001 Mayo
6,234,833 B1 5/2001 Tsai et al.
6,273,918 B1 8/2001 Yuhasz et al.
6,275,778 B1 8/2001 Shimada et al.
6,285,097 B1 9/2001 Hazelton et al.
6,387,096 B1 5/2002 Hyde, Jr.
6,457,179 B1 10/2002 Prendergast
6,467,326 B1 10/2002 Garrigus
6,535,092 B1 3/2003 Hurley et al.
6,540,515 B1 4/2003 Tanaka
6,599,321 B2 7/2003 Hyde, Jr.
6,607,304 B1 8/2003 Lake et al.
6,652,278 B2 11/2003 Honkura et al.
6,653,919 B2 11/2003 Shih-Chung et al.
6,720,698 B2 4/2004 Galbraith
6,747,537 B1 6/2004 Mosteller
6,842,332 B1 1/2005 Rubenson et al.
6,847,134 B2 1/2005 Frissen et al.
6,850,139 B1 2/2005 Dettmann et al.
6,862,748 B2 3/2005 Prendergast
6,864,773 B2 3/2005 Perrin
6,913,471 B2 7/2005 Smith
6,927,657 B1 8/2005 Wu
6,954,938 B2 10/2005 Emberty et al.
6,954,968 B1 10/2005 Sitbon
6,971,147 B2 12/2005 Halstead
7,016,492 B2 3/2006 Pan et al.
7,031,160 B2 4/2006 Tillotson
7,033,400 B2 4/2006 Currier
7,038,565 B1 5/2006 Chell
7,065,860 B2 6/2006 Aoki et al.
7,066,739 B2 6/2006 McLeish
7,066,778 B2 6/2006 Kretzschmar
7,101,374 B2 9/2006 Hyde, Jr.
7,137,727 B2 11/2006 Joseph et al.
7,186,265 B2 3/2007 Sharkawy et al.
7,224,252 B2 5/2007 Meadow, Jr. et al.
7,264,479 B1 9/2007 Lee
7,276,025 B2 10/2007 Roberts et al.
7,339,790 B2 3/2008 Baker et al.
7,362,018 B1 4/2008 Kulogo et al.
7,381,181 B2 6/2008 Lau et al.
7,402,175 B2 7/2008 Azar
7,438,726 B2 10/2008 Erb
7,444,683 B2 11/2008 Prendergast et al.
7,453,341 B1 11/2008 Hildenbrand
7,498,914 B2 3/2009 Miyashita et al.
7,583,500 B2 9/2009 Ligtenberg et al.
7,715,890 B2 5/2010 Kim et al.

(56) References Cited

U.S. PATENT DOCUMENTS

| | | | |
|---|---|---|---|
| 7,775,567 | B2 | 8/2010 | Ligtenberg et al. |
| 7,796,002 | B2 | 9/2010 | Hashimoto et al. |
| 7,808,349 | B2 | 10/2010 | Fullerton et al. |
| 7,812,697 | B2 | 10/2010 | Fullerton et al. |
| 7,817,004 | B2 | 10/2010 | Fullerton et al. |
| 7,832,897 | B2 | 11/2010 | Ku |
| 7,837,032 | B2 | 11/2010 | Smeltzer |
| 7,839,246 | B2 | 11/2010 | Fullerton et al. |
| 7,843,297 | B2 | 11/2010 | Fullerton et al. |
| 7,868,721 | B2 | 1/2011 | Fullerton et al. |
| 7,874,856 | B1 | 1/2011 | Schriefer et al. |
| 7,889,037 | B2 | 2/2011 | Cho |
| 7,903,397 | B2 | 3/2011 | McCoy |
| 7,905,626 | B2 | 3/2011 | Shantha et al. |
| 8,002,585 | B2 | 8/2011 | Zhou |
| 8,099,964 | B2 | 1/2012 | Saito et al. |
| 2002/0125977 | A1 | 9/2002 | VanZoest |
| 2003/0170976 | A1 | 9/2003 | Molla et al. |
| 2003/0179880 | A1 | 9/2003 | Pan et al. |
| 2003/0187510 | A1 | 10/2003 | Hyde |
| 2004/0003487 | A1 | 1/2004 | Reiter |
| 2004/0155748 | A1 | 8/2004 | Steingroever |
| 2004/0244636 | A1 | 12/2004 | Meadow et al. |
| 2004/0251759 | A1 | 12/2004 | Hirzel |
| 2005/0102802 | A1 | 5/2005 | Sitbon et al. |
| 2005/0196484 | A1 | 9/2005 | Khoshnevis |
| 2005/0231046 | A1 | 10/2005 | Aoshima |
| 2005/0240263 | A1 | 10/2005 | Fogarty et al. |
| 2005/0263549 | A1 | 12/2005 | Scheiner |
| 2006/0066428 | A1 | 3/2006 | McCarthy et al. |
| 2006/0189259 | A1 | 8/2006 | Park et al. |
| 2006/0198047 | A1 | 9/2006 | Xue et al. |
| 2006/0214756 | A1 | 9/2006 | Elliott et al. |
| 2006/0290451 | A1 | 12/2006 | Prendergast et al. |
| 2006/0293762 | A1 | 12/2006 | Schulman et al. |
| 2007/0072476 | A1 | 3/2007 | Milan |
| 2007/0075594 | A1 | 4/2007 | Sadler |
| 2007/0103266 | A1 | 5/2007 | Wang et al. |
| 2007/0138806 | A1 | 6/2007 | Ligtenberg et al. |
| 2007/0255400 | A1 | 11/2007 | Parravicini et al. |
| 2008/0119250 | A1 | 5/2008 | Cho et al. |
| 2008/0139261 | A1 | 6/2008 | Cho et al. |
| 2008/0174392 | A1 | 7/2008 | Cho |
| 2008/0181804 | A1 | 7/2008 | Tanigawa et al. |
| 2008/0186683 | A1 | 8/2008 | Ligtenberg et al. |
| 2008/0218299 | A1 | 9/2008 | Arnold |
| 2008/0224806 | A1 | 9/2008 | Ogden et al. |
| 2008/0272868 | A1 | 11/2008 | Prendergast et al. |
| 2008/0282517 | A1 | 11/2008 | Claro |
| 2009/0021333 | A1 | 1/2009 | Fiedler |
| 2009/0209173 | A1 | 8/2009 | Arledge et al. |
| 2009/0250576 | A1 | 10/2009 | Fullerton et al. |
| 2009/0251256 | A1 | 10/2009 | Fullerton et al. |
| 2009/0254196 | A1 | 10/2009 | Cox et al. |
| 2009/0278642 | A1 | 11/2009 | Fullerton et al. |
| 2009/0289090 | A1 | 11/2009 | Fullerton et al. |
| 2009/0289749 | A1 | 11/2009 | Fullerton et al. |
| 2009/0292371 | A1 | 11/2009 | Fullerton et al. |
| 2010/0033280 | A1 | 2/2010 | Bird et al. |
| 2010/0126857 | A1 | 5/2010 | Polwart et al. |
| 2010/0167576 | A1 | 7/2010 | Zhou |
| 2011/0026203 | A1 | 2/2011 | Ligtenberg et al. |
| 2011/0210636 | A1 | 9/2011 | Kuhlmann-Wilsdorf |
| 2011/0234344 | A1 | 9/2011 | Fullerton et al. |
| 2011/0248806 | A1 | 10/2011 | Michael |
| 2011/0279206 | A1 | 11/2011 | Fullerton et al. |

FOREIGN PATENT DOCUMENTS

| | | | |
|---|---|---|---|
| EP | 0 345 554 | A1 | 12/1989 |
| EP | 0 545 737 | A1 | 6/1993 |
| FR | 823395 | | 1/1938 |
| GB | 1 495 677 | A | 12/1977 |
| JP | 60-091011 | U | 5/1985 |
| WO | WO-02/31945 | A2 | 4/2002 |
| WO | WO-2007/081830 | A2 | 7/2007 |
| WO | WO-2009/124030 | A1 | 10/2009 |
| WO | WO-2010/141324 | A1 | 12/2010 |

OTHER PUBLICATIONS

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog__pdfs/BNS__B20.pdf, 2 pages, date unknown.

Series BNS333, Coded-Magnet Sensors with Integral Safety Control Module, http://www.schmersalusa.com/machine__guarding/coded__magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Mar. 12, 2012, issued in counterpart U.S. Appl. No. 12/206,270.

United States Office Action, dated Feb. 22, 2011, issued in counterpart U.S. Appl. No. 12/476,952.

United States Office Action, dated Oct. 12, 2011, issued in counterpart U.S. Appl. No. 12/476,952.

United States Office Action, dated Mar. 9, 2012, issued in counterpart U.S. Appl. No. 13/371,280.

International Search Report and Written Opinion, dated May 14, 2009, issued in related International Application No. PCT/US2009/038925.

International Search Report and Written Opinion, dated Jul. 13, 2010, issued in related International Application No. PCT/US2010/021612.

International Search Report and Written Opinion dated Jun. 1, 2009, issued in related International Application No. PCT/US2009/002027.

International Search Report and Written Opinion, dated Aug. 18, 2010, issued in related International Application No. PCT/US2010/036443.

International Search Report and Written Opinion, dated Apr. 8, 2011 issued in related International Application No. PCT/US2010/049410.

Atallah, K., Calverley, S.D., D. Howe, 2004, "Design, analysis and realisation of a high-performance magnetic gear", IEE Proc.-Electr. Power Appl., vol. 151, No. 2, Mar. 2004.

Atallah, K., Howe, D. 2001, "A Novel High-Performance Magnetic Gear", IEEE Transactions on Magnetics, vol. 37, No. 4, Jul. 2001, p. 2844-46.

Bassani, R., 2007, "Dynamic Stability of Passive Magnetic Bearings", Nonlinear Dynamics, V. 50, p. 161-68.

Boston Gear 221S-4, One-stage Helical Gearbox, http://www.bostongear.com/pdf/product__sections/200__series__helical.pdf, referenced Jun. 2010.

Charpentier et al., 2001, "Mechanical Behavior of Axially Magnetized Permanent-Magnet Gears", IEEE Transactions on Magnetics, vol. 37, No. 3, May 2001, p. 1110-17.

(56) References Cited

OTHER PUBLICATIONS

Chau et al., 2008, "Transient Analysis of Coaxial Magnetic Gears Using Finite Element Comodeling", Journal of Applied Physics, vol. 103.
Choi et al., 2010, "Optimization of Magnetization Directions in a 3-D Magnetic Structure", IEEE Transactions on Magnetics, vol. 46, No. 6, Jun. 2010, p. 1603-06.
Correlated Magnetics Research, 2009, Online Video, "Innovative Magnetics Research in Huntsville", http://www.youtube.com/watch?v=m4m81JjZCJo.
Correlated Magnetics Research, 2009, Online Video, "Non-Contact Attachment Utilizing Permanent Magnets", http://www.youtube.com/watch?v=3xUm25CNNgQ.
Correlated Magnetics Research, 2010, Company Website, http://www.correlatedmagnetics.com.
Furlani 1996, "Analysis and optimization of synchronous magnetic couplings", J. Appl. Phys., vol. 79, No. 8, p. 4692.
Furlani 2001, "Permanent Magnet and Electromechanical Devices", Academic Press, San Diego.
Furlani, E.P., 2000, "Analytical analysis of magnetically coupled multipole cylinders", J. Phys. D: Appl. Phys., vol. 33, No. 1, p. 28-33.
General Electric DP 2.7 Wind Turbine Gearbox, http://www.gedrivetrain.com/insideDP27.cfm, referenced Jun. 2010.
Ha et al., 2002, "Design and Characteristic Analysis of Non-Contact Magnet Gear for Conveyor by Using Permanent Magnet", Conf. Record of the 2002 IEEE Industry Applications Conference, p. 1922-27.
Huang et al., 2008, "Development of a Magnetic Planetary Gearbox", IEEE Transactions on Magnetics, vol. 44, No. 3, p. 403-12.
International Search Report and Written Opinion of the International Searching Authority issued in Application No. PCT/US12/61938 dated Feb. 26, 2013.
International Search Report and Written Opinion of the International Searching Authority issued in Application No. PCT/US2013/028095 dated May 13, 2013.
Jian et al., "Comparison of Coaxial Magnetic Gears With Different Topologies", IEEE Transactions on Magnetics, vol. 45, No. 10, Oct. 2009, p. 4526-529.
Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.
Jørgensen, F.T., Andersen, T.O., Rasmussen P.O., 2005, "Two dimensional model of a permanent magnet spur gear", Conf. Record of the 2005 IEEE Industry Applications Conference, p. 261-5.
Jørgensen, F.T., Andersen, T.O., Rasmussen, P.O. "The Cycloid Permanent Magnetic Gear", IEEE Transactions on Industry Applications, vol. 44, No. 6, Nov./Dec. 2008, p. 1659-65.
Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.
Krasil'nikov et al., 2009, "Torque Determination for a Cylindrical Magnetic Clutch", Russian Engineering Research, vol. 29, No. 6, pp. 544-47.
Liu et al., 2009, "Design and Analysis of Interior-magnet Outer-rotor Concentric Magnetic Gears", Journal of Applied Physics, vol. 105.
Lorimer, W., Hartman, A., 1997, "Magnetization Pattern for Increased Coupling in Magnetic Clutches", IEEE Transactions on Magnetics, vol. 33, No. 5, Sep. 1997.
Mezani, S., Atallah, K., Howe, D. , 2006, "A high-performance axial-field magnetic gear", Journal of Applied Physics vol. 99.
Mi, "Magnetreater/Charger Model 580" Magnetic Instruments Inc. Product specification, May 4, 2009, http://web.archive.org/web/20090504064511/http://www.maginst.com/specifications/580_magnetreater.htm, 2 pages.
Neugart PLE-160, One-Stage Planetary Gearbox, http://www.neugartusa.com/ple_160_gb.pdf, referenced Jun. 2010.
Notice of Allowance issued in U.S. Appl. No. 13/471,189 dated Apr. 3, 2013.
Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.
United States Office Action issued in U.S. Appl. No. 13/104,393 dated Apr. 4, 2013.
United States Office Action issued in U.S. Appl. No. 13/374,074 dated Feb. 21, 2013.
United States Office Action issued in U.S. Appl. No. 13/470,994 dated Jan. 7, 2013.
United States Office Action issued in U.S. Appl. No. 13/529,520 dated Sep. 28, 2012.
United States Office Action issued in U.S. Appl. No. 13/530,893 dated Mar. 22, 2013.
United States Office Action issued in U.S. Appl. No. 13/855,519 dated Jul. 17, 2013.
United States office Action issued in U.S. Appl. No. 13/246,584 dated May 16, 2013.
United States Office Action issued in U.S. Appl. No. 13/470,994 dated Aug. 8, 2013.
United States Office Action issued in U.S. Appl. No. 13/430,219 dated Aug. 13, 2013.

* cited by examiner

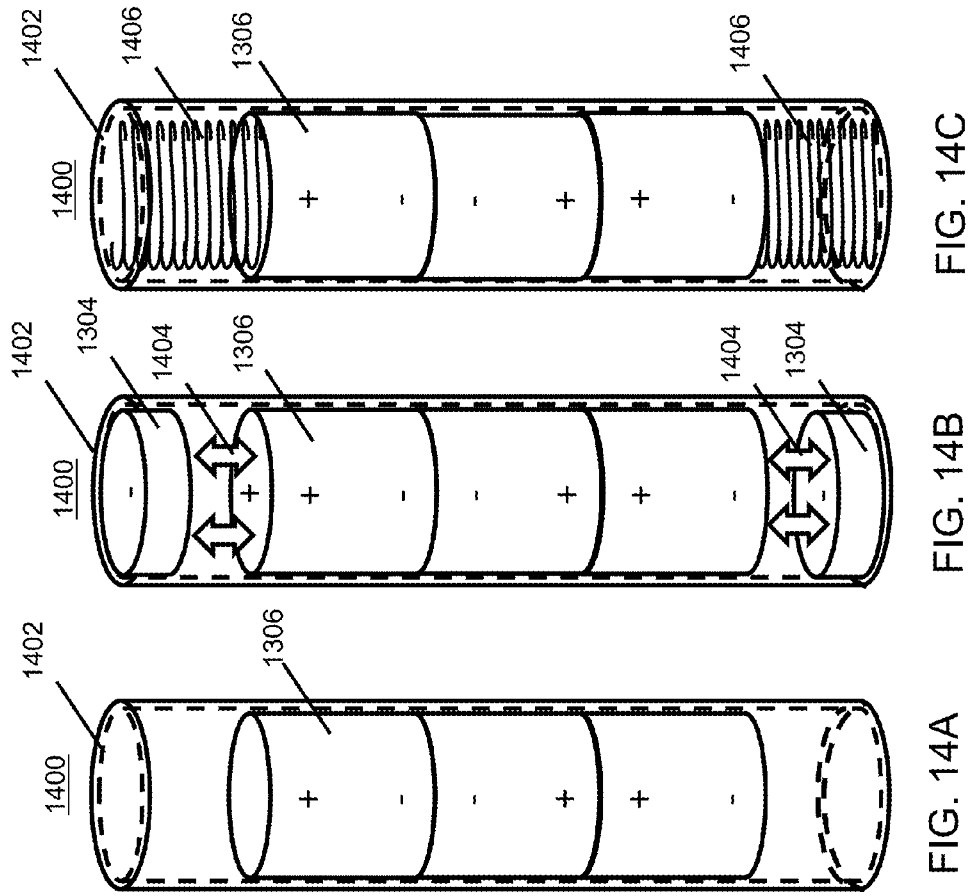
FIG. 14A
FIG. 14B
FIG. 14C
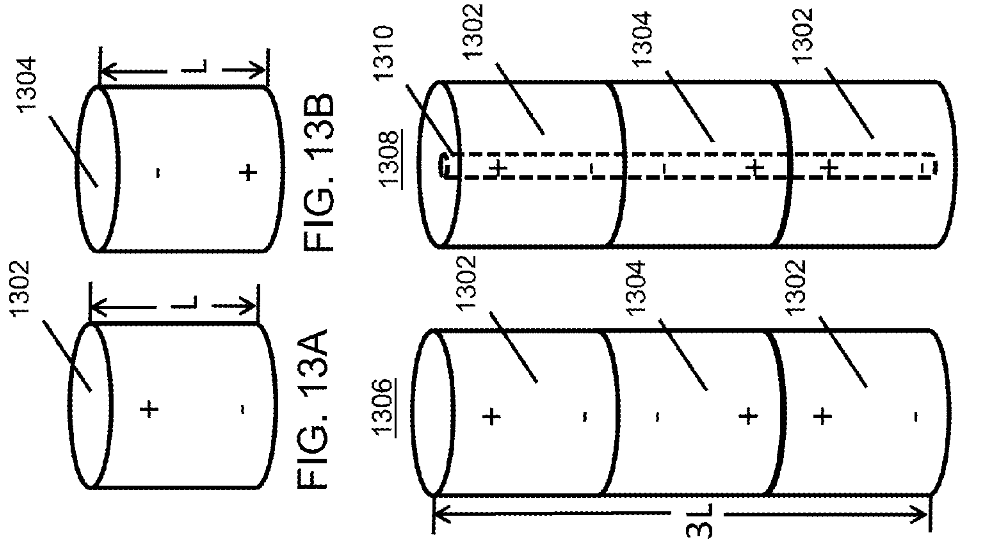
FIG. 13A
FIG. 13B
FIG. 13C
FIG. 13D 1 coil – 1 magnet 1 coil – 2 magnets 1 coil – 3 magnets 2 coils – 1 magnet 2 coils – 2 magnets 2 coils – 3 magnets 10 coils –1 magnet 10 coils – 3 magnets 10 coils – 4 magnets

ELECTROMAGNETIC STRUCTURE HAVING A CORE ELEMENT THAT EXTENDS MAGNETIC COUPLING AROUND OPPOSING SURFACES OF A CIRCULAR MAGNETIC STRUCTURE

CLAIMING BENEFIT OF PRIOR FILED U.S. APPLICATIONS

This patent application claims the priority benefit of U.S. Provisional Application No. 61/455,820 filed Oct. 27, 2010, Provisional Application No. 61/455,337 filed Oct. 19, 2010, and Provisional Application No. 61/400,995 filed Sep. 17, 2010, which are incorporated herein by reference in their entirety.

FIELD OF THE INVENTION

The present invention relates generally to a system and method for power generation. More particularly, the present invention relates to a system and method for power generation using multi-pole magnetic structures.

BACKGROUND OF THE INVENTION

A key principle of operation of an alternating-current (AC) motor is that a permanent magnet will rotate so as to maintain its alignment within an external rotating magnetic field. This effect is the basis for the early AC motors including the "Electro Magnetic Motor" for which Nikola Tesla received U.S. Pat. No. 381,968 on May 1, 1888. On Jan. 19, 1938, Marius Lavet received French Patent 823,395 for the stepper motor which he first used in quartz watches. Stepper motors divide a motor's full rotation into a discrete number of steps. By controlling the times during which electromagnets around the motor are activated and deactivated, a motor's position can be controlled precisely. Methods for generating power using magnetic structures are known. Also known are magnetizable material that can be magnetized to have a pattern of magnetic poles, referred to herein as maxels. It has been discovered that various field emission properties can be put in use in a wide range of applications.

SUMMARY

Briefly, according to the invention, an electromagnetic structure comprises a rotor assembly having at least one circular magnetic structure. The structure has opposing first and second surfaces that extend around a peripheral boundary region. A plurality of emission regions are disposed along said peripheral boundary region, with each emission region presenting poles having opposite polarities of a first polarity and a second polarity on the opposing first and second surfaces of the circular magnetic structure. Adjacent emission regions have alternating pole orientations such that each emission source having the first polarity is between two emission sources having the second polarity and each emission source having the second polarity is between two emission sources having the first polarity. A rotational element rotates the at least one circular magnetic structure about a rotation axis that is perpendicular to the opposing first and second surfaces. At least one stator assembly comprises at least one core element and at least one coil winding wound around the at least one core element. The core element extends from the first surface around to the second surface to magnetically couple the poles of opposite polarities of each respective one of the plurality of emission regions when said rotor is rotated about said rotation axis.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 13A depicts an exemplary axially magnetized cylinder-shaped permanent magnet having a first polarity orientation;

FIG. 13B depicts another exemplary axially magnetized cylinder-shaped permanent magnet having a second polarity orientation that is opposite the first polarity orientation depicted in FIG. 13A;

FIG. 13C depicts a magnet stack of three axially magnetized cylinder-shaped permanent magnets having been glued to maintain an alternating polarity-orientation pattern such that the polarity at each of the two ends of the middle magnet is the same as the polarity of the abutting ends of the two outer magnets;

FIG. 13D depicts a magnet stack of three axially magnetized cylinder-shaped permanent magnets having holes through their centers and held together with a rod to maintain an alternating polarity-orientation pattern such that the polarity at each of the two ends of the middle magnet is the same as the polarity of the abutting ends of the two outer magnets;

FIG. 14A depicts an exemplary moveable magnet assembly including a tube and a magnet stack of three axially magnetized cylinder-shaped permanent magnets arranged to have an alternating polarity-orientation pattern, where the magnet stack can move within the tube;

FIG. 14B depicts the exemplary moveable magnet assembly of FIG. 14A with the addition of two fixed magnets at each end of the tube with each fixed magnet having a polarity-orientation such that they will repel the nearest magnet in the magnet stack;

FIG. 14C depicts the exemplary moveable magnet assembly of FIG. 14A with the addition of two springs at each end with each spring providing a spring force against the nearest magnet in the magnet stack;

FIG. 19G depicts the generator of FIG. 19A with the magnet stack moved to a third position;

FIG. 20B depicts an exemplary ring-shaped moveable magnet assembly where a circular tube has a partial ring-shaped magnet where the partial ring-shaped magnet is completed with a lighter material that causes the magnet to remain in substantially the same vertical orientation while the outer tube turns relative to the magnet;

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The present invention magnetic structures and magnetization techniques related to those described in U.S. patent application Ser. No. 12/358,423, filed Jan. 23, 2009, U.S. patent application Ser. No. 12/322,561, filed Feb. 4, 2009, and U.S. patent application Ser. No. 12/476,952, filed Jun. 2, 2009. It also includes disclosure described in U.S. Provisional Patent Application 61/283,780, titled "A System and Method for Producing Multi-level Magnetic Fields", filed Dec. 9, 2009 and described in U.S. Provisional Patent Application 61/399,448, titled "A System and Method for Producing Multi-level Magnetic Fields", filed Jul. 12, 2010, and U.S. Provisional Patent Application 61/400,995, titled "A System and Method for Power Generation", filed Sep. 17, 2010. These six patent applications are all incorporated herein by reference in their entirety.

Figure 1:
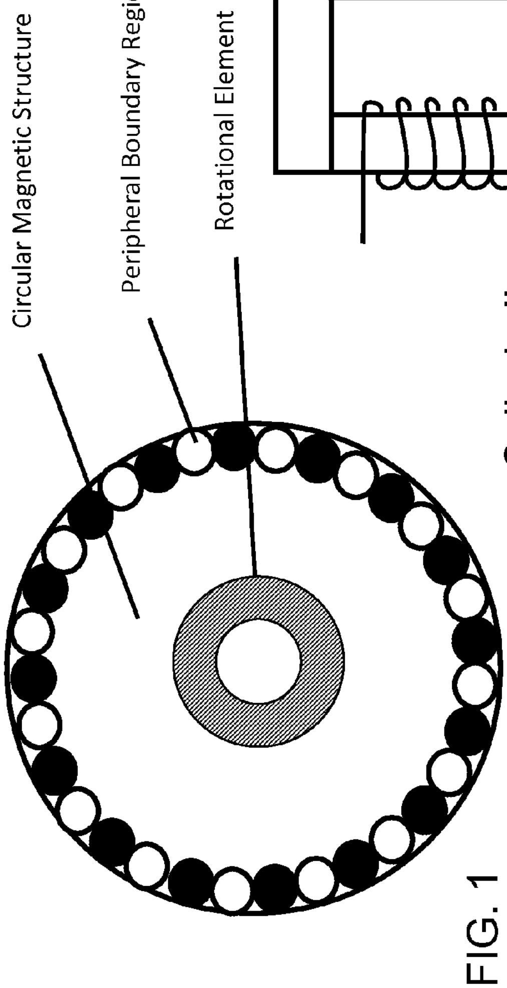
FIG. 1 depicts a round magnetizable material having been programmed about its outer perimeter with alternating polarity maxels.

An electromagnetic structure according to the present invention includes a rotor assembly and a stator assembly. FIG. 1 shows the top view of the rotor assembly, which includes a circular magnetic structure and a rotational element. The circular magnetic structure has opposing first and second surfaces that extend around a peripheral boundary region. The first surface may be the top surface of the circular magnetic structure, the second surface may be the bottom surface of the circular magnetic structure, and the peripheral boundary region may be the region of the circular magnetic structure on the outer portions of the circular magnetic structure.

The circular magnetic structure includes a plurality of emission regions disposed along the peripheral boundary region. Emission regions may be regions of the circular magnetic structure that correspond to poles or maxels. In FIG. 1, multiple emission regions are shown as multiple poles, or maxels, having been programmed around the peripheral boundary of the circular magnetizable material. Maxels of one polarity are shown in white and maxels of the opposite polarity are shown in black. On the opposite side of the material, the maxels have the opposite polarity than shown in FIG. 1. Emission regions may present poles having opposite polarities of a first polarity and a second polarity. The first and second polarities may be North and South polarities, shown as positive and negative symbols. The poles of opposite polarities may be on the opposing first and second surfaces of the circular magnetic structure so that an emission region with a North polarity on the top surface of the circular magnetic structure has a South polarity on the bottom surface of the circular magnetic structure.

The emission regions are arranged so that adjacent emission regions have alternating pole orientations such that each emission source having the first polarity is between two emission sources having the second polarity. For example, an emission region with a North polarity on the top surface of the circular magnetic structure may be between two emission regions having a South polarity on the top surface of the circular magnetic structure. The emission regions may further be arranged to that each emission source having the second polarity is between two emission sources having the first polarity. For example, an emission region with a South polarity on the top surface of the circular magnetic structure may be between two emission regions having a North polarity on the top surface of the circular magnetic structure.

Figure 2:
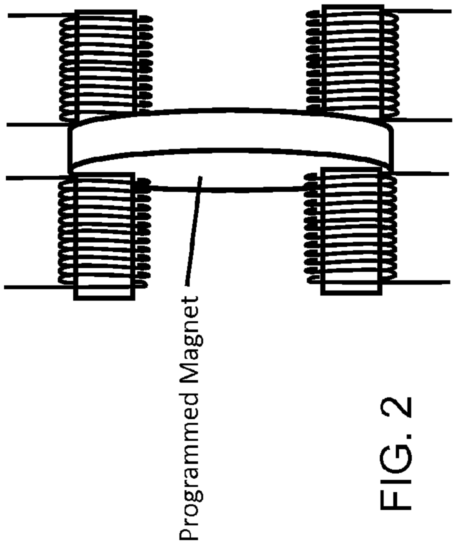
FIG. 2 depicts the round magnetizable material of FIG. 1 relative to field coils.
Figure 3:
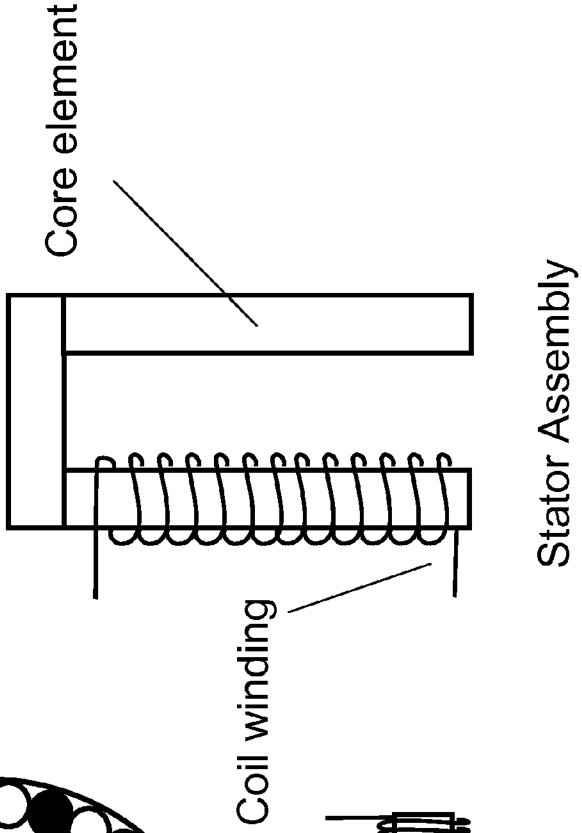
FIG. 3 depicts use of a common core element extending from a solenoid coil over a first magnetic source to an adjacent opposite pole magnetic source.

The electromagnetic structure of the present invention also includes a stator assembly. FIG. 2 shows one embodiment of a stator assembly where a programmed magnet in conjunction with two separate core elements having coil windings on either side of the programmed magnet. FIG. 3 shows yet another stator assembly for the electromagnetic structure of the invention, which includes one core element that extends electromagnetic coupling from the first surface around to the second surface of the circular magnetic structure of FIG. 1, as further described below in connection with FIGS. 7 and 8A-B. Herein, the term core element refers to the ferromagnetic (or laminated ferromagnetic) material used to complete a circuit between two magnetic sources (or poles) having opposite polarity. It is desirable that the core element material used in accordance with the invention have a high relative permeability (e.g., $\mu_R$=150-800) allowing the core elements of side-by-side stator assemblies to have a very narrow air gap between them where the magnetic flux doesn't substantially bridge the air gap. Under the core element arrangement of FIG. 3, electromagnetic coupling startles the poles of opposite polarities of each respective one of the plurality of emission regions when the rotor is rotated about a rotation axis that is perpendicular to the opposing surfaces of the circular magnetic structure. The stator assembly further includes a coil winding wound around the at least one core element. For example, the coil winding may be wound so that a portion of the core element runs parallel to the axis upon which the coil winding is wound. The core element of the stator of FIG. 3 is made of ferromagnetic material or laminated ferromagnetic material (e.g., iron, iron alloy, ferrite, powdered iron, magnetic ceramic, etc.).

One aspect of the present invention involves efficient methods for generating power using a multi-pole magnetic structures such as magnetizable material magnetized to have an pattern of magnetic poles, referred to herein as maxels. The pattern may be an alternating pattern or a non-alternating pattern, where the maxels may be arranged in a circle, an arc, or in a row. By moving the magnetic structure relative to one or more coils (or vice versa) power is efficiently generated.

FIGS. 1-3 depicts an electrical generator apparatus that generates electricity based on the movement of at least one field coil to at least one multi-pole magnetic structure (or programmed magnet) printed into a magnetized material. As such, whenever a field coil is moved relative to the magnetizable material and maxels, electricity is generated when the coil moves from a positive polarity maxel to a negative polarity maxel or vice versa. As shown in FIG. 2, multiple coils can be used on either side of the programmed magnet where the programmed magnet can be moved or the coils can be moved or some combination thereof.

One embodiment is a monopole field coil where one pole of a solenoid is in proximity to the alternating magnetic polarities provided by one side of the programmed magnetizable material. Yet another embodiment is a second solenoid in proximity to the alternating magnetic polarities provided by a second side of the programmed magnetizable material.

Although the magnetizable material is shown to be round, different shapes of magnetizable material and corresponding patterns of maxels can be employed as appropriate to accommodate different types of movement to include circular movement, partial circular movement, linear movement, or any definable or random movement relative to maxels of a printed (or programmed) magnet.

Movement used to generate electricity using an electrical generation apparatus in accordance with the invention could be via a hand (e.g., a crank), wind, waves, or any other movement where there is differential motion.

The pattern of maxels used in such electrical generation devices can be alternating polarities or coded. The coded version would be useful to match a load that is periodic or aperiodic.

As further described later, an inphase and quadrature (IQ) power generation device can be produced in accordance with the invention that involve movement of field coils relative to a plurality of magnetic field sources (maxels or conventional magnets) where the one or more pairs of field coils are each 90 degrees out of phase with respect to the spacing of the magnetic sources.

Generator devices in accordance with the invention can be designed to work with slow moving objects, for example, a wind mill, without requiring the gears currently being used to achieve adequate power generation.

The discussion that follows is presented using the basic concept of turning a magnetic structure relative to one or more fixed stator assemblies each comprising one or more coils that are wrapped around one or more core elements. Alternatively the invention could be practiced by turning the stator assemblies relative to a fixed magnetic structure or some combination of both that stator assemblies and the magnetic structure being able to move.

Herein, the term core element refers to the ferromagnetic (or laminated ferromagnetic) material used to complete a circuit between two magnetic sources (or poles) having opposite polarity. It is desirable that the core element material used in accordance with the invention have a high relative permeability (e.g., $\mu_R$=150-800) allowing the core elements of side-by-side stator assemblies to have a very narrow air gap between them where the magnetic flux doesn't substantially bridge the air gap.

As described above, the electromagnetic structure of the present invention includes a rotor assembly and a stator assembly. The rotor assembly includes a circular magnetic structure and a rotational element. The circular magnetic structure may have opposing first and second surfaces that extend around a peripheral boundary region. The first surface may be the top surface of the circular magnetic structure and the second surface may be the bottom surface of the circular magnetic structure. The circular magnetic structure includes a plurality of emission regions disposed along the peripheral boundary region. Emission regions may be regions of the circular magnetic structure that correspond to poles or maxels. Emission regions may present poles having opposite polarities of a first polarity and a second polarity. The first and second polarities may be North and South polarities, shown as positive and negative symbols, respectively, in FIGS. 4A-4C. The poles of opposite polarities may be on the opposing first and second surfaces of the circular magnetic structure so that an emission region with a North polarity on the top surface of the circular magnetic structure has a South polarity on the bottom surface of the circular magnetic structure.

The emission regions may further be arranged so that adjacent emission regions have alternating pole orientations such that each emission source having the first polarity is between two emission sources having the second polarity. For example, an emission region with a North polarity on the top surface of the circular magnetic structure may be between two emission regions having a South polarity on the top surface of the circular magnetic structure. The emission regions may further be arranged to that each emission source having the second polarity is between two emission sources having the first polarity. For example, an emission region with a South polarity on the top surface of the circular magnetic structure may be between two emission regions having a North polarity on the top surface of the circular magnetic structure.

Figures 4A, 4B, 4C, 4D, 5A, 5B:
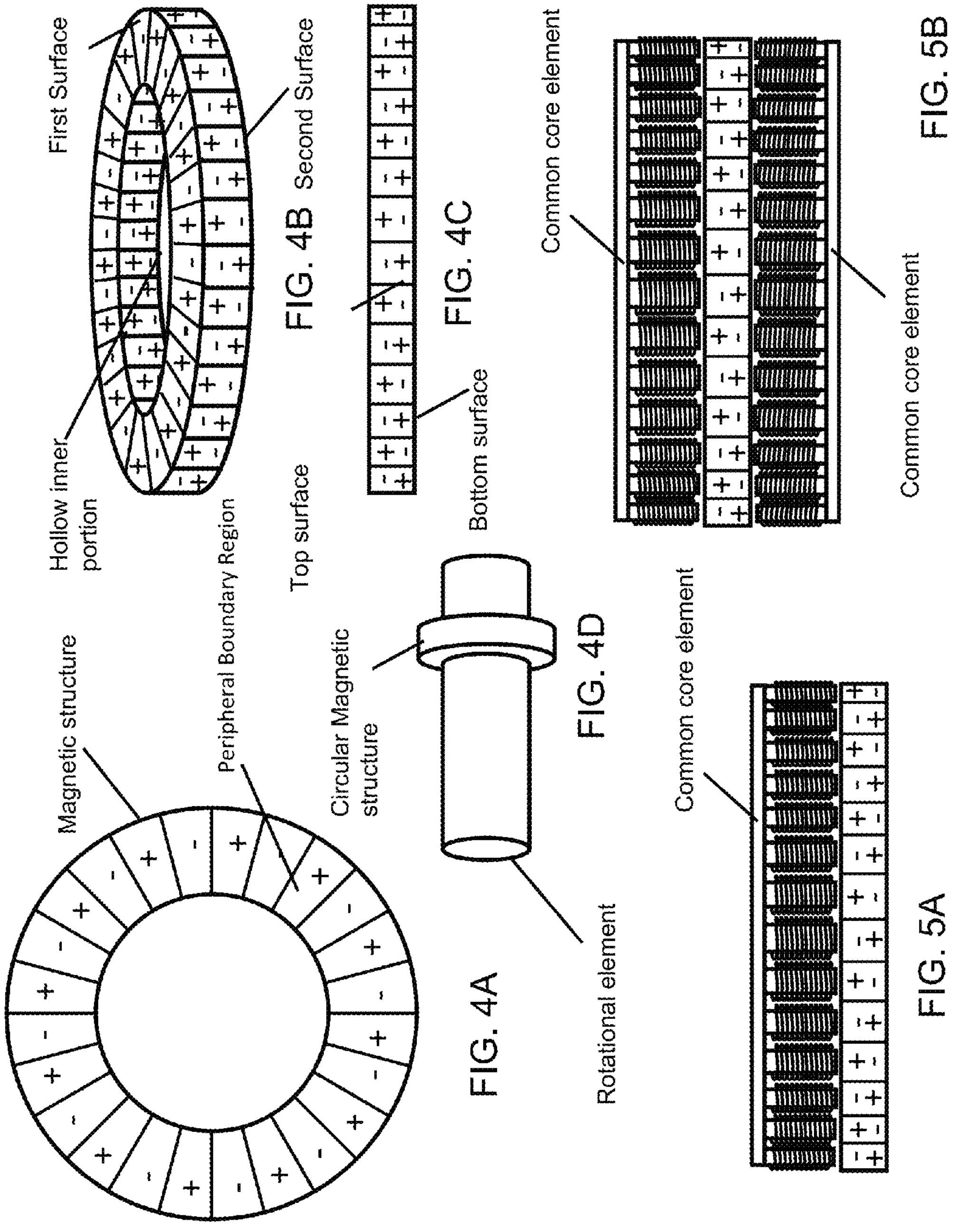
FIG. 4A-4C depict top, oblique, and side views of an exemplary ring magnet programmed with an alternating polarity pattern of 24 poles in a circle.
FIG. 4D depicts a rotor assembly including a circular magnetic structure and a rotational element.
FIG. 5A depicts field coils around straight core elements that are attached to a circular common core element that is on one side of the ring magnet of FIGS. 4A-4C.
FIG. 5B depicts field coils around straight core elements that are attached to two circular common core elements that are on both sides of the ring magnet of FIGS. 4A-4C.

In an embodiment, he circular magnetic structure may be a circular ring structure having a hollow inner portion relative to the peripheral boundary. For example, the peripheral boundary may be the outer portion of a circular ring structure. FIGS. 4A-4C depict top, oblique, and side views of an exemplary ring magnet programmed with an alternating polarity pattern of 24 poles in a circle. In a preferred embodiment, the pattern would include an even number of alternating poles that could be multiplied by an integer to achieve 60 Hz, for example 30 poles. Meeting these criteria makes it easy to understand the relationship between pole transitions per rotation when it is desirable to achieve 60 Hz power but otherwise meeting these criteria is not a requirement to practice the invention. The poles are shown being wedge shaped so as to optimize use of the material but could have many different shapes such as radial stripes, concentric circles of maxels, or any other desired shape.

FIG. 4D depicts a rotor assembly including a circular magnetic structure and a rotational element for rotating the circular magnetic structure about a rotation axis that is perpendicular to the opposing first and second surfaces of the circular magnetic structure. The rotational element may be a non-conductive non-magnetic structure, for example, a structure made of polycarbonate. The rotational element may be a cylinder with a diameter matching the diameter of a center hole of the circular magnetic structure. In another embodiment, the rotation element may be a shaft with a diameter less than the diameter of a center hole of the circular magnetic structure where the circular magnetic structure is coupled to the shaft by spokes.

FIG. 5A depicts field coils around straight core elements that are attached to a circular common core element that are on one side of the ring magnet of FIGS. 4A-4C. Alternatively, the circular common core element could be subdivided to provide magnetic circuits between pairs of core elements such as previously described in relation to FIG. 3. Moreover, many different combinations are possible for producing magnetic circuits using one or more common core elements, which need not be circular.

FIG. 5B depicts field coils around straight core elements that are attached to two circular common core elements that are on both sides of the ring magnet of FIGS. 4A-4C. Generally, applying coils to both sides of the magnetic structure doubles the output of the generator and also makes it is easy to balance the power output. Moreover, although not shown in FIG. 5B, the top and bottom stator assemblies could be oriented to produce an inphase and quadrature relationship as previously described by employing two assemblies aligned with a 90° phase shift between them.

Figure 6A:
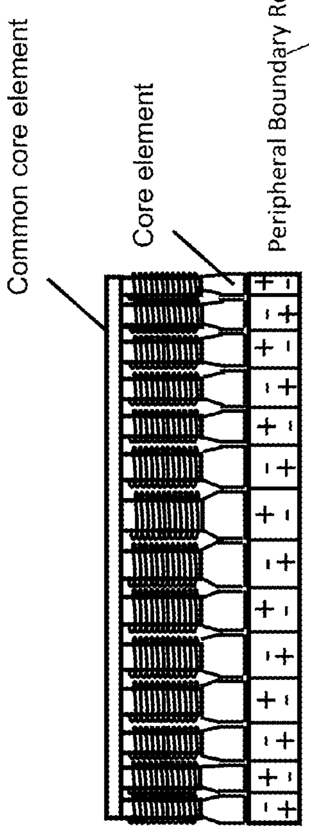
FIG. 6A depicts field coils around beveled core elements that are attached to a circular common core element that are on one side of the ring magnet of FIGS. 4A-4C.

FIG. 6A depicts field coils around beveled core elements that are attached to a circular common core element that is on one side of the ring magnet of FIGS. 4A-4C. Because the configuration of having core elements perpendicular to the magnetic structure requires the core elements to be smaller in size where the coil is wound so that the coils will not be in contact, maximum flux output isn't achieved if the core elements are straight (i.e., cylindrical or rod like). However, as shown in FIG. 6A, the core elements can have a portion nearest the magnetic structure that is beveled or otherwise flares out to more closely match the shape of the magnetic sources (or poles). Many different shapes and sizes of a core element could be configured to vary the flux produced as the magnetic structure is turned relative to the stator assembly.

Figure 6B:
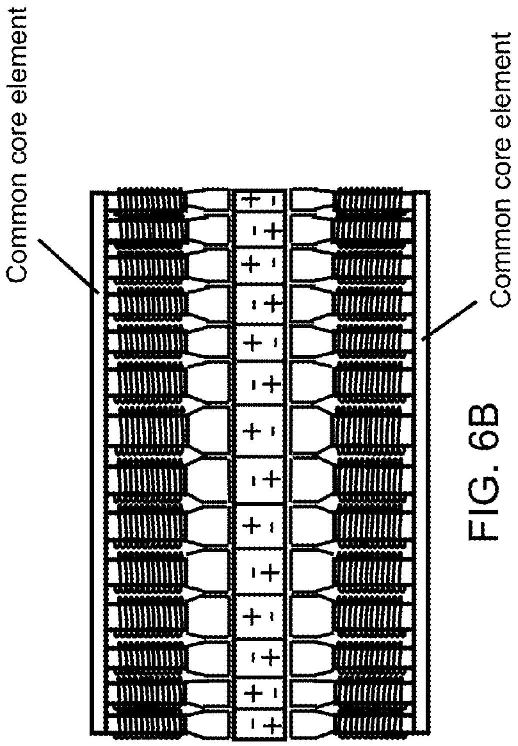
FIG. 6B depicts field coils around beveled core elements that are attached to two circular common core elements that are on both sides of the ring magnet of FIGS. 4A-4C.

FIG. 6B depicts field coils around beveled core elements that are attached to two circular common core elements that are on both sides of the ring magnet of FIGS. 4A-4C. The comments provided in relation to FIG. 5B above also apply to the configuration shown in FIG. 6B.

As stated above, the stator assembly of the electromagnetic structure may include at least one core element that extends from the first surface around to the second surface of a circular magnetic structure to magnetically couple the poles of opposite polarities of each respective one of the plurality of emission regions when the rotor is rotated about the rotation axis. The stator assembly may further include at least one coil winding wound around the at least one core element according to the direction of a current through the at least one coil. For example, the coil winding may be wound so that a portion of the core element runs parallel to the axis upon which the coil winding is wound.

Figure 7:
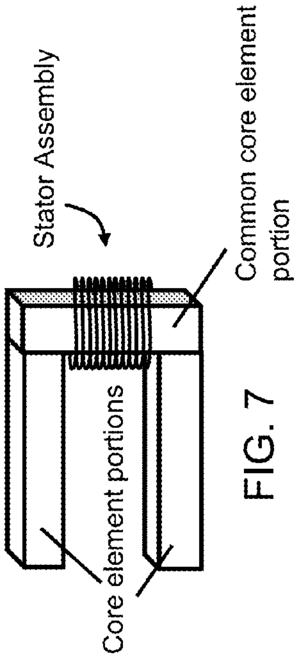
FIG. 7 depicts an exemplary stator assembly intended to straddle the side of the magnetic structure such that it produces a magnetic circuit between the North and South poles of the magnetic sources as the magnet and/or stator assembly is moved relative to the other.

FIG. 7 depicts an exemplary stator assembly intended to straddle the side of the magnetic structure such that it produces a magnetic circuit between the North and South poles of the magnetic sources as the magnet is rotated relative to the stator assembly. The core element include core element portions and common core element portion. As shown a coil is shown being wound about a common core element portion of the stator assembly that is between two core element portions of the assembly. Alternatively or additionally one or more coils could be wound around the core element portions at some location that is beyond the radius of the magnetic structure.

Figure 8A:
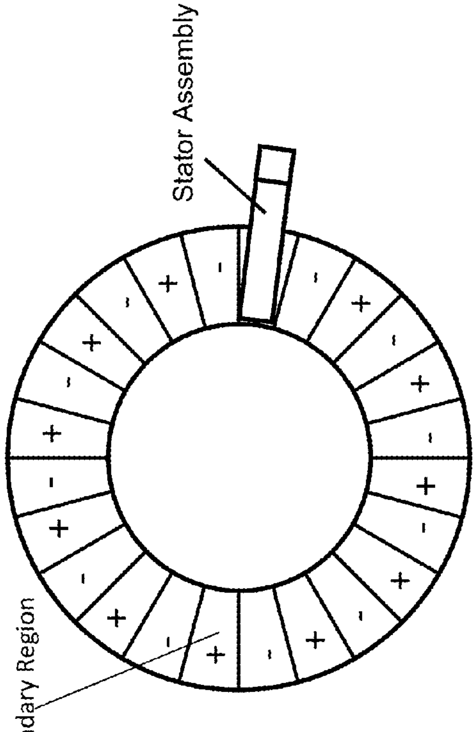
FIG. 8A depict top and side views of the stator assembly of FIG. 7 as positioned to straddle the magnetic structure.
Figure 8B:
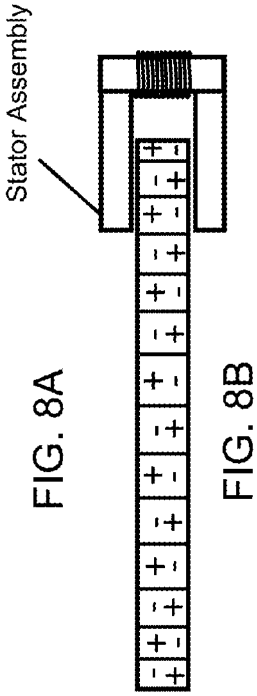

FIG. 8A depict top and side views of the stator assembly of FIG. 7 as positioned to straddle the magnetic structure. It should be noted that the length of the two core element portions was arbitrarily selected to provide spacing between the coil and the magnetic structure. It should be also noted that it is desirable that the spacing between the core elements and the magnetic structure be minimal to maximize magnetic flux. Under one arrangement, the coil portion of the stator assembly would be covered or otherwise sealed such that ferromagnetic fluid could be placed into the air gap between the two core element portions and the magnetic structure.

Figure 9A:
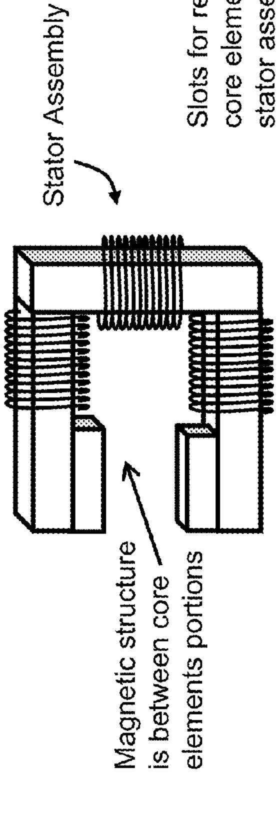
FIGS. 9A-9C depicts alternative shapes for the core element portions of stator assemblies used to straddle a magnetic structure as well as alternative locations for coils associated with the core element portions of the stator assemblies.
Figure 9B:
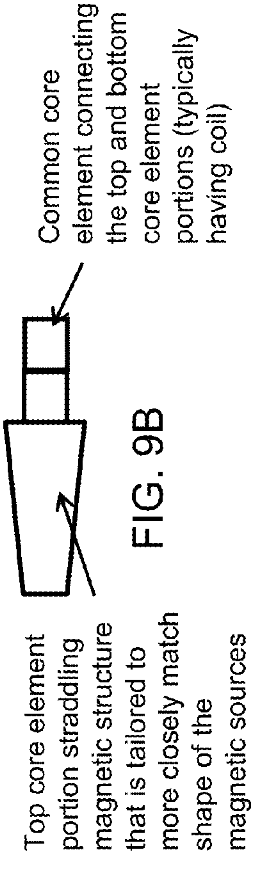
Figure 9C:
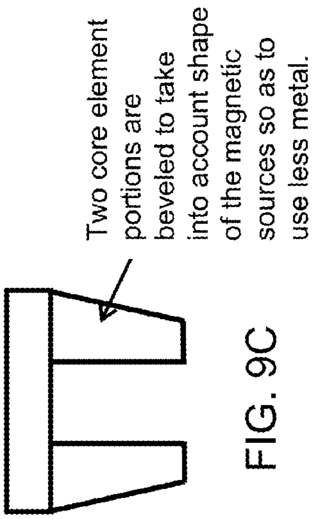

FIG. 9A-9C depicts alternative shapes for the core element portions of stator assemblies used to straddle a magnetic structure as well as alternative locations for coils associated with the core element portions of the stator assemblies. FIG. 9A depicts a stator assembly where the core elements have a portion that approaches the magnetic structure from both sides at 90 degree angle. This approach allows more core element material to be used and more coils to be used.

In an embodiment, the core element may include a coil element portion of a first dimension for winding a coil. The first dimension may be the width of the coil element portion. The coil element portion may be the portions of the core element upon which the coil is wound. The coil element portion may be the portion as shown in FIG. 9A that does not approach the magnetic structure from the sides. The core element may further include an interface portion, of a second dimension, positioned closer to the circular magnetic structure than the coil element portion. The second dimension may be the width of the interface portion, which may be greater than the first dimension. For example, the interface portion of the core element may be a portion shown in FIG. 9A which approaches the magnetic structure.

FIG. 9B depicts a portion of the core element being shaped so as to more closely match the shape of the magnetic sources. In a plane perpendicular to the rotation axis of the circular magnetic structure, the interface portion has a cross sectional shape dimensioned to correspond to the shape of an emission region. For example, the interface portion in FIG. 9B is shaped like a wedge similarly to the wedge shaped emission regions of the circular magnetic structure in FIG. 4A.

FIG. 9C depicts varying the thickness of the core elements in such a way as to account for difference in flux produce at different radial distances from the center axis of the magnetic structure. As such, the coil and core element could be designed to maximize flux output while minimizing core element material and wire used in the generator.

Figure 10A:
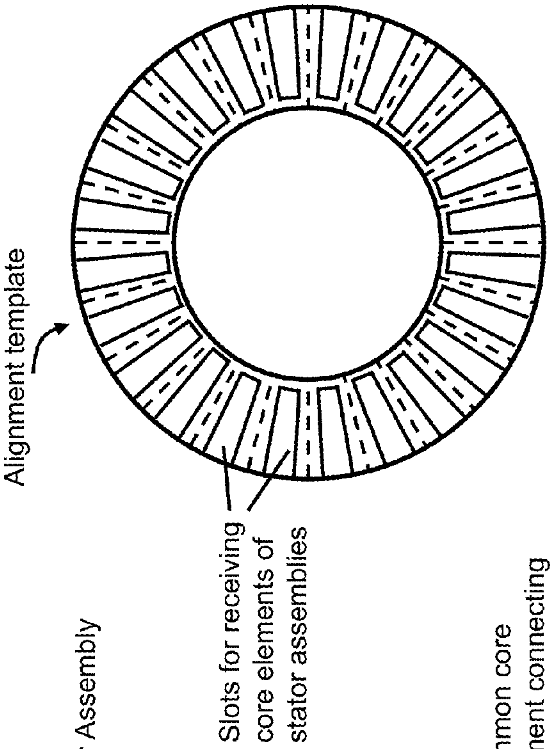
FIG. 10A depicts a non-conductive non-magnetic stator assembly alignment template that is used to position multiple stator assemblies around the perimeter of a ring magnetic structure.

FIG. 10A depicts a non-conductive non-magnetic stator assembly alignment template that is used to position multiple stator assemblies around the perimeter of a ring magnetic structure. The template may align at least one stator assembly with a circular magnetic structure. Stator assemblies such as shown in FIG. 7 can be individually placed into the alignment templates as part of the assembly process, whereby additional power generation can be achieved by adding additional stator assemblies.

Figure 10B:
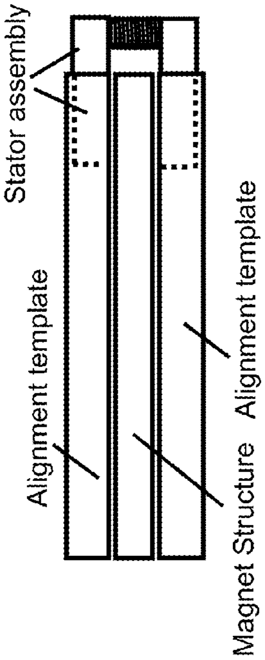
FIG. 10B depicts a stator assembly placed within two alignment templates and thereby positioned to straddle a magnetic structure.

FIG. 10B depicts a stator assembly placed within two alignment templates and thereby positioned to straddle a magnetic structure.

In an embodiment, the stator assembly may include a first stator assembly and a second stator assembly where the first stator assembly is positioned relative to the second stator assembly such that when the first stator assembly is substantially aligned with a first emission source having a first polarity on the first surface, the second stator assembly is substantially aligned with a second emission source having a second state on the first surface. For example, the alignment template shown in FIG. 10A may be used to ensure the first stator assembly and second stator assembly are relatively positioned accordingly.

In an embodiment, the stator assembly may include a first stator assembly and a second stator assembly where the first stator assembly has a first coil winding and the second stator assembly has a second winding such that corresponding currents through the first coil winding and the second coil winding have the same direction. For example, the first coil winding and second coil winding may be both wound clockwise or both wound counterclockwise.

In an embodiment, the stator assembly may include a first stator assembly and a second stator assembly, the first stator assembly having a first coil winding and the second stator assembly having a second coil winding. The first stator assembly may be positioned relative to the second stator assembly such that corresponding currents through the first coil winding and the second coil winding have an in phase and quadrature phase relationship. For example, the first stator assembly and second stator assembly may be positioned so that when the first stator assembly is substantially aligned with a first emission source having a first polarity on the first surface, the second stator assembly is substantially aligned 90° out of phase with a second emission source on the first surface. In an embodiment, the in phase and quadrature phase relationship may be due to quadrature phase shift relationship in the stator assemblies or quadrature phase shift relationship in the poles.

In an embodiment, a plurality of circular magnetic structures may be parallel to each other perpendicular to a rotation axis.

Figure 11A:
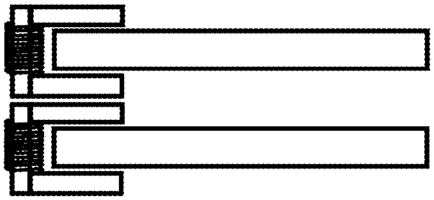
FIG. 11A depicts side views of two magnetic structures like those of FIGS. 4A-4C having exemplary stator assemblies arranged in an inphase and quadrature relationship.

FIG. 11A depicts side views of two magnetic structures like those of FIGS. 4A-4C having exemplary stator assemblies arranged in an inphase and quadrature relationship. Either one of the two stator assemblies could have a quadrature phase shift relative to the other while poles of the two magnetic structures could remain aligned. Or, the poles of the two magnetic structures could have a quadrature phase shift relationship and the stator assemblies could remain aligned. Various other combinations are possible for achieving an inphase and quadrature relationship between the two magnetic structure/stator assemblies so as generate constant power as described previously.

Figure 11B:
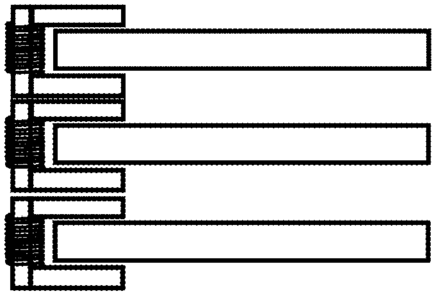
FIG. 11B depicts side views of three magnetic structures like those of FIGS. 4A-4C having exemplary stator assemblies arranged in an three phase power arrangement.

FIG. 11B depicts side views of three magnetic structures like those of FIGS. 4A-4C having exemplary stator assemblies arranged in a three phase power arrangement. Similar to what was described in relation to FIG. 11A, various methods could be used to achieve a 120 degree relationship between the three different magnetic structure/stator assemblies in order to achieve 3 phase power output.

Figure 11C:
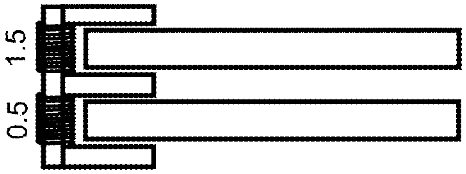

FIG. 11C shows a stator assembly where a single core element portion is placed between two magnetic structures. As shown, one fourth of the power output would be produced by the left coil and three fourths of the power output would be produced by the right coil. Generally, all sorts of unbalanced core element portion arrangements are possible for accommodating variable power requirements.

Figure 12A:
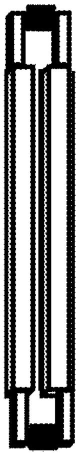
FIG. 12A depicts an alternative stator assembly intended for use with a cylindrically shaped magnetic structure and having coils at each end of the stator assembly.

FIG. 12A depicts an alternative stator assembly intended for use with a cylindrically shaped magnetic structure and having coils at each end of the stator assembly. The stator assembly has two long core element portions sized to be substantially the same size as the poles (i.e., the stripes magnetic sources) of a cylindrical magnetic structure and having smaller portions that enable common core elements between them to accommodate coils.

Figure 12B:
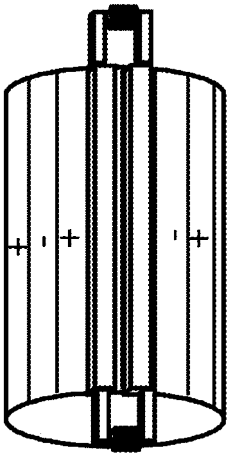
FIG. 12B depicts a cylindrically shaped magnetic structure having striped alternating polarity poles and having a stator structure having coils at each end where the core elements of the stator structure are parallel to the cylinder and sized to closely match the pole sizes.

FIG. 12B depicts a cylindrically shaped magnetic structure having striped alternating polarity poles and having a stator assembly having coils at each end where the core elements of the stator structure are parallel to the cylinder and sized to closely match the pole sizes. As shown, the stator assembly has coils at both end but could have a coil at only one end. Moreover, the core elements are not required to extend the full length of the cylinder as shown.

Figure 12C:
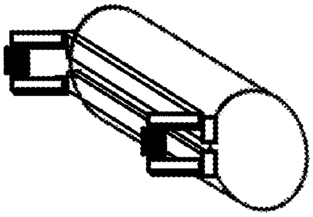
FIG. 12C depicts an alternative stator assembly intended for use with a cylindrically shaped magnetic structure and having portions of the core elements that extend upward from the cylinder.

FIG. 12C depicts an alternative stator assembly intended for use with a cylindrically shaped magnetic structure and having portions of the core elements that extend perpendicular to the cylinder much like the stator assembly of FIG. 3. Generally, many different variations of stator assemblies are possible for use with a cylindrical magnetic structure as described herein.

FIG. 13A depicts an exemplary axially magnetized cylinder-shaped permanent magnet 1302 having a first polarity orientation. The magnet 1302 has a length L.

FIG. 13B depicts another exemplary axially magnetized cylinder-shaped permanent magnet 1304 having a second polarity orientation that is opposite the first polarity orientation depicted in FIG. 13A. The magnet 1304 also has a length L.

FIG. 13C depicts a magnet stack 1306 of three axially magnetized cylinder-shaped permanent magnets having been glued (or otherwise attached) to maintain an alternating polarity-orientation pattern such that the polarity at each of the two ends of the middle magnet 1304 is the same as the polarity of the abutting ends of the two outer magnets 1302.

FIG. 13D depicts a magnet stack 1308 of three axially magnetized cylinder-shaped permanent magnets having holes through their centers and held together with a rod 1310 to maintain an alternating polarity-orientation pattern such that the polarity at each of the two ends of the middle magnet 1304 is the same as the polarity of the abutting ends of the two outer magnets 1302.

FIG. 14A depicts an exemplary moveable magnet assembly 1400 including a tube 1402 and a magnet stack 1306 of three axially magnetized cylinder-shaped permanent magnets arranged to have an alternating polarity-orientation pattern, where the magnet stack 1306 can move within the tube 1402.

FIG. 14B depicts the exemplary moveable magnet assembly 1400 of FIG. 14A with the addition of two fixed magnets 1304 at each end of the tube 1402 with each fixed magnet 1304 having a polarity-orientation such that they will repel the nearest magnet 1302 in the magnet stack 1306. Under one arrangement, the fixed magnet is moveable (e.g., on a screw) so that the repel force can be tuned.

FIG. 14C depicts the exemplary moveable magnet assembly 1400 of FIG. 14A with the addition of two springs 1406 at each end with each spring 1406 providing a spring force against the nearest magnet 1302 in the magnet stack 1306.

Figure 15A:
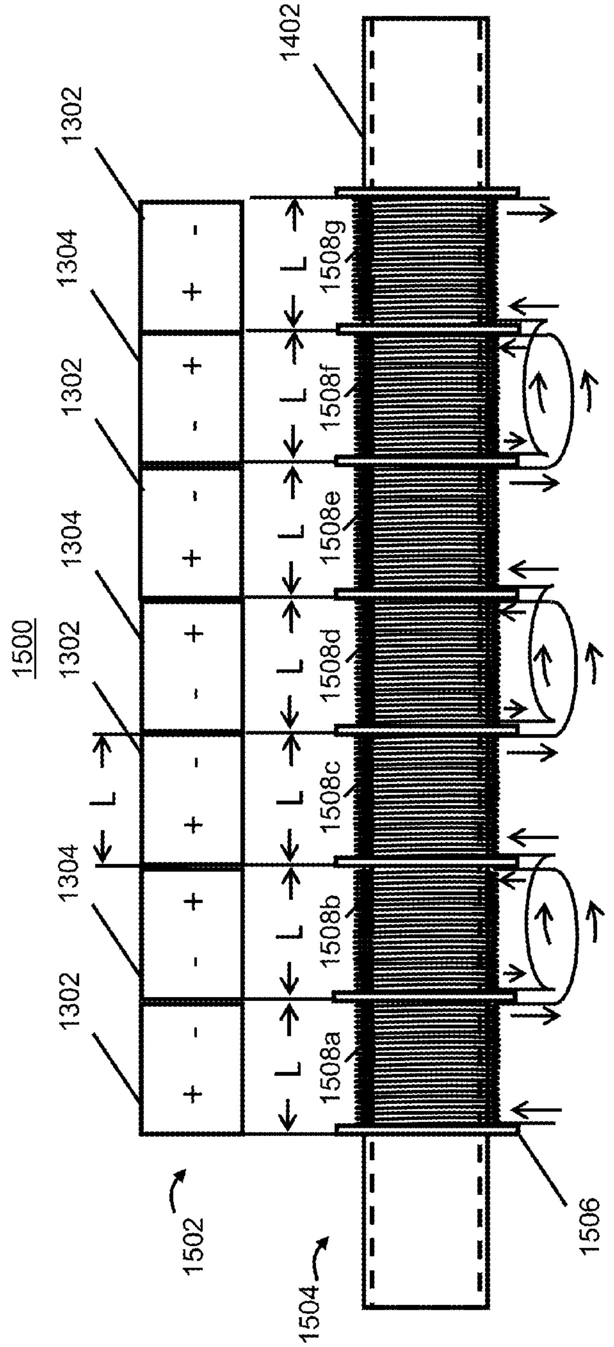
FIG. 15A depicts an exemplary power generation system including a magnet stack of seven axially-magnetized magnets arranged in an alternating polarity-orientation pattern and a coil assembly and spacers configured on the outside of a tube within which the magnet stack can be inserted and moved back and forth within the tube.
Figure 15B:
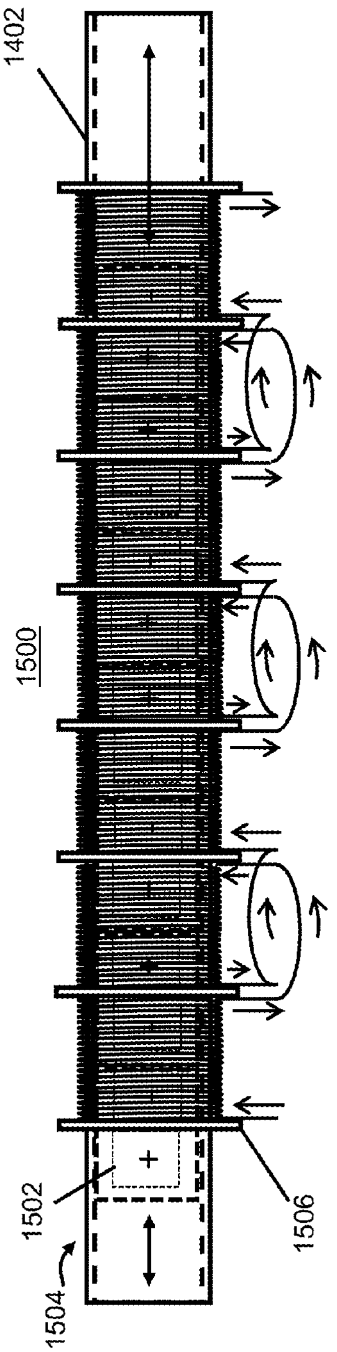
FIG. 15B depicts the exemplary power generation system of FIG. 15A where the magnet stack of seven axially-magnetized magnets arranged in an alternating polarity-orientation pattern is shown to be inside the tube and able to move back and forth within the tube.

FIG. 15A depicts an exemplary power generation system 1500 including a magnet stack 1502 of seven axially-magnetized magnets arranged in an alternating polarity-orientation pattern and a movable magnet assembly 1504 having a coil assembly 1508a-1508g and spacers 1506 configured on the outside of a tube 1402 within which the magnet stack 1502 can be inserted and moved back and forth within the tube 1402. The coils 1508a are configured such that the direction of current alternates with each successive coil to correspond to the alternating polarity-orientation pattern of the magnet stack 1502. This configuration can be achieved by wrapping (or coiling) wire in the same direction for each separate coil 1508a-1508g and then connecting the coils in an alternating manner such as depicted in FIGS. 15A and 15B. Alternatively, the direction of coiling the wire could alternate for each successive coil 1508a-1508g. With this alternative approach, one continuous wire could be used to produce the coil assembly, which could pass through notches included in the spacers.

FIG. 15B depicts the exemplary power generation system 1500 of FIG. 15A where the magnet stack 1502 of seven axially-magnetized magnets arranged in an alternating polarity-orientation pattern is shown to be inside the tube 1402 and able to move back and forth within the tube 1402.

Figure 16A:
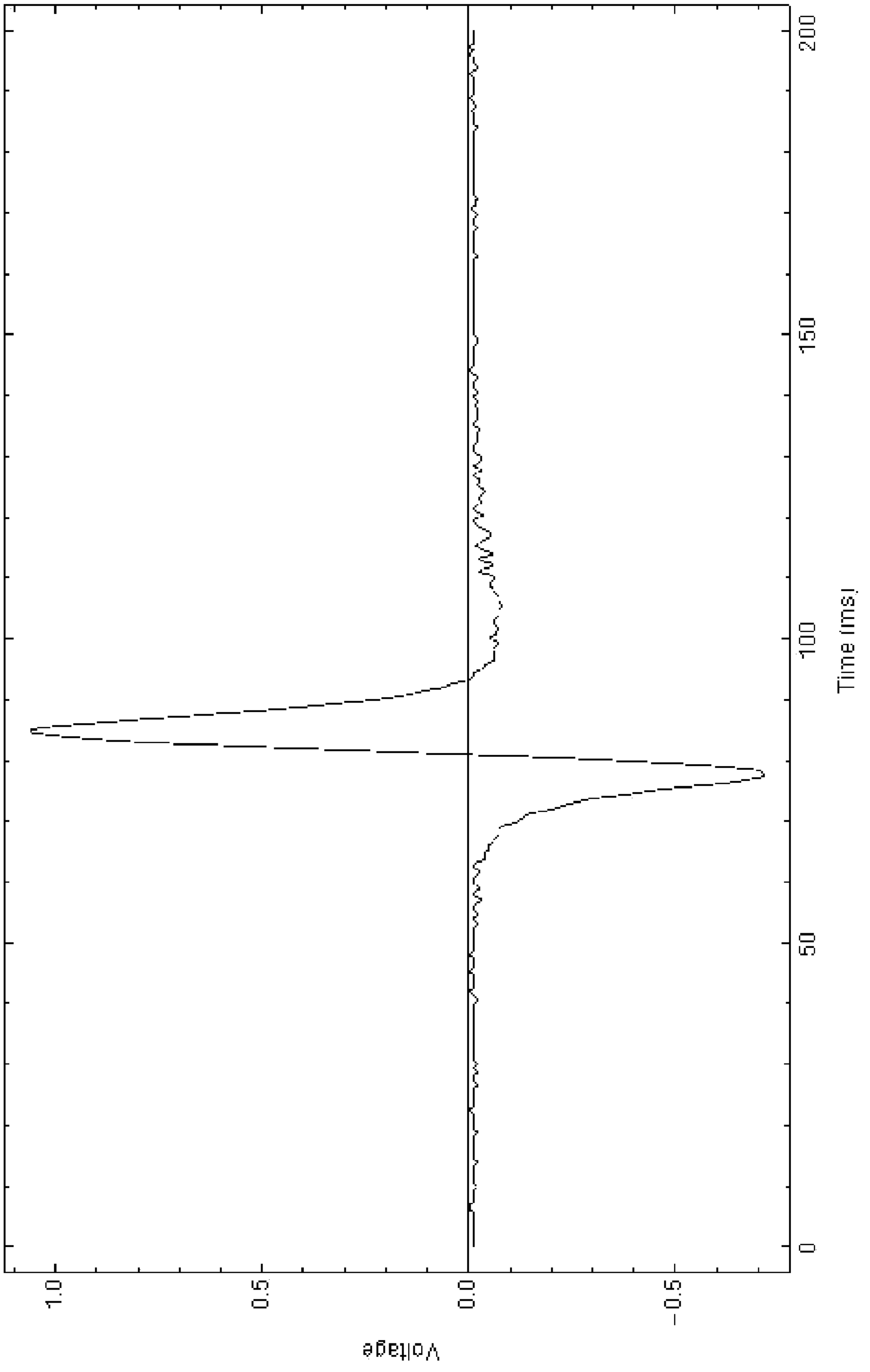
FIG. 16A depicts an exemplary RF signal corresponding to a monocycle produced by dropping one axially-magnetized magnet down a tube having one coil.

FIG. 16A depicts an exemplary RF signal corresponding to a monocycle produced by dropping one axially-magnetized magnet down a tube having one coil.

Figure 16B:
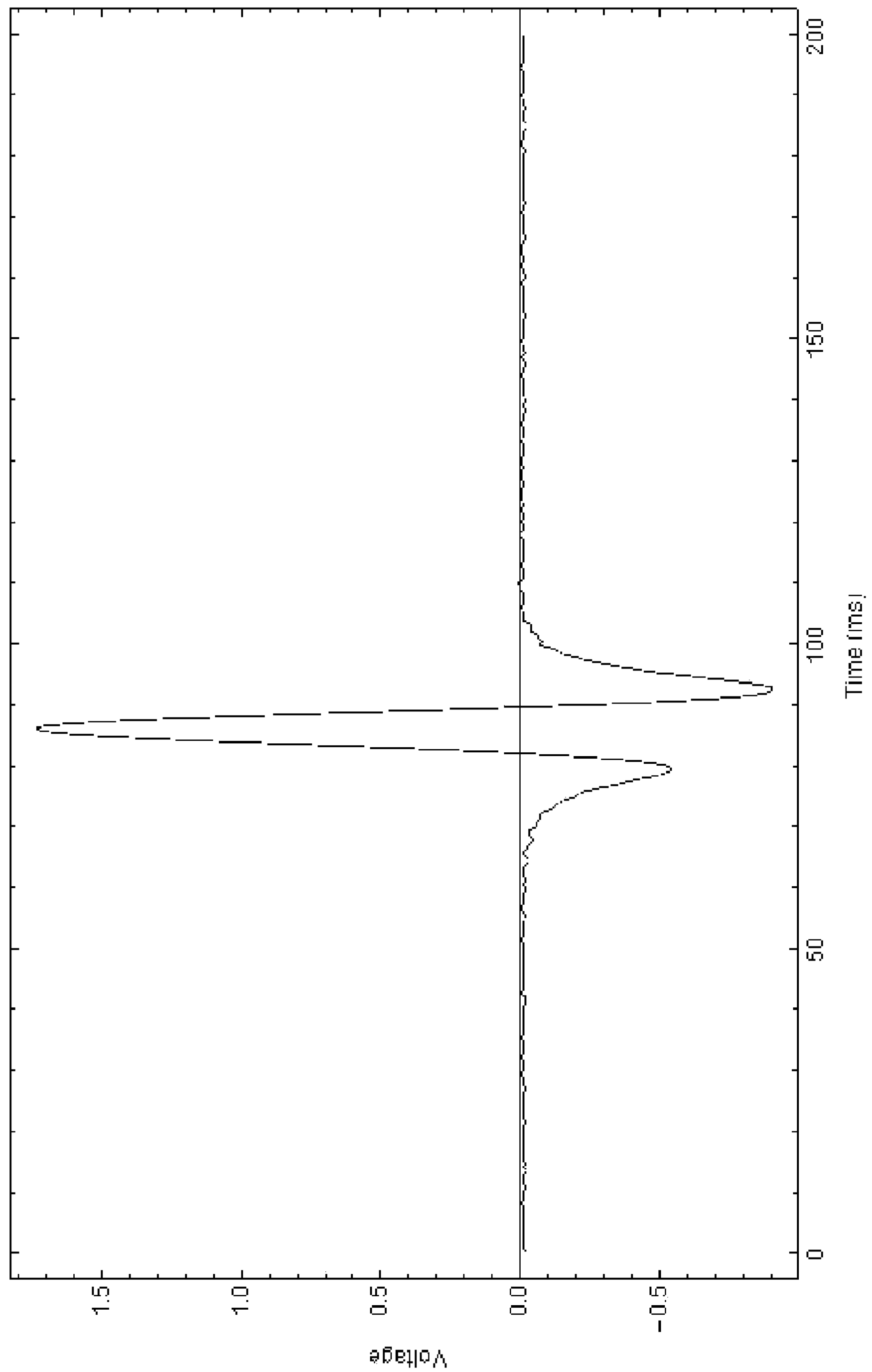
FIG. 16B depicts an exemplary RF signal corresponding to two overlapping monocycles produced by dropping a magnet stack of two axially-magnetized magnets arranged in an alternating polarity-orientation pattern down a tube having one coil.

FIG. 16B depicts an exemplary RF signal corresponding to two overlapping monocycles produced by dropping a magnet stack of two axially-magnetized magnets arranged in an alternating polarity-orientation pattern down a tube having one coil.

Figure 16C:
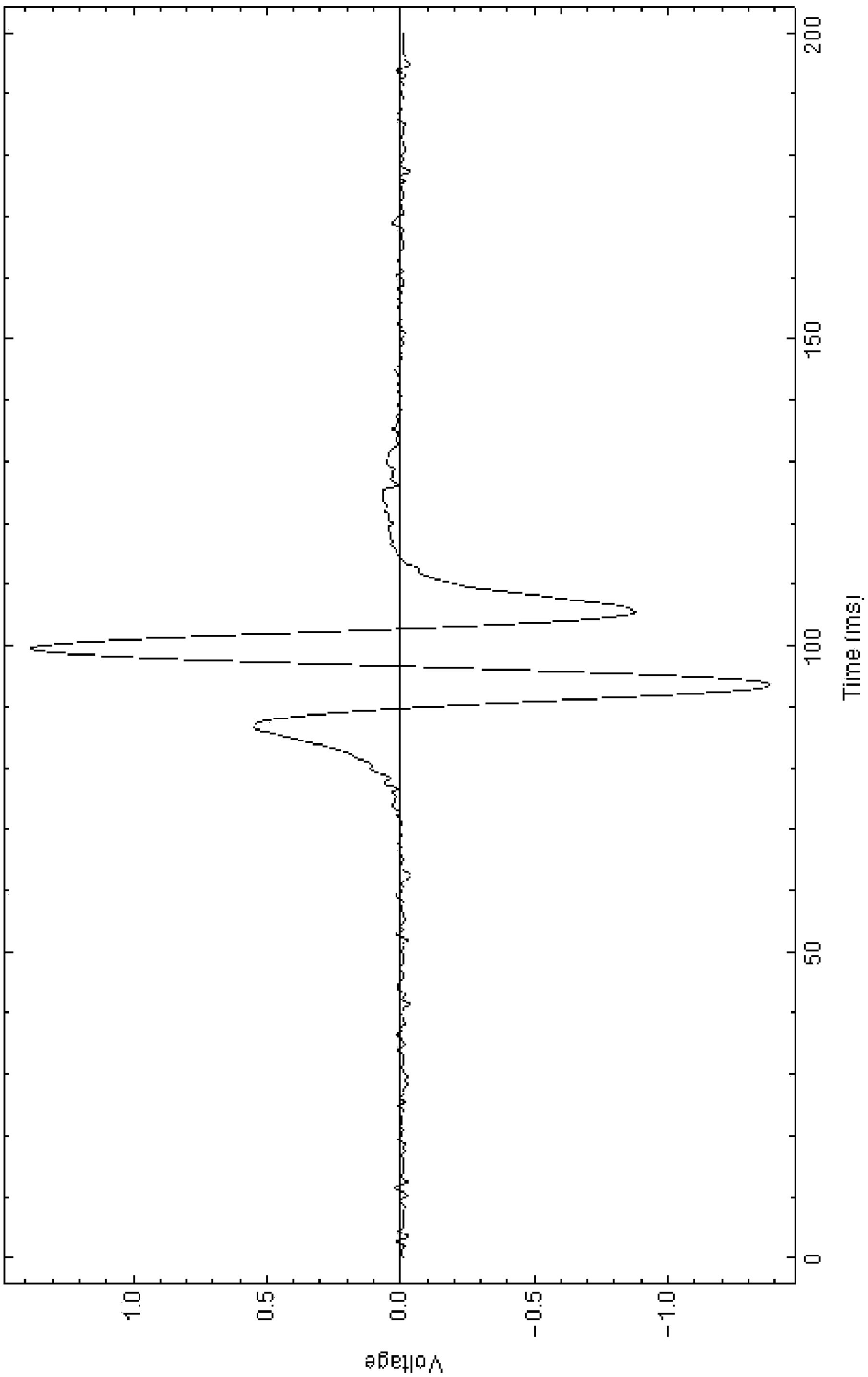
FIG. 16C depicts an exemplary RF signal corresponding to three overlapping monocycles produced by dropping a magnet stack of three axially-magnetized magnets arranged in an alternating polarity-orientation pattern down a tube having one coil.

FIG. 16C depicts an exemplary RF signal corresponding to three overlapping monocycles produced by dropping a magnet stack of three axially-magnetized magnets arranged in an alternating polarity-orientation pattern down a tube having one coil.

Figure 16D:
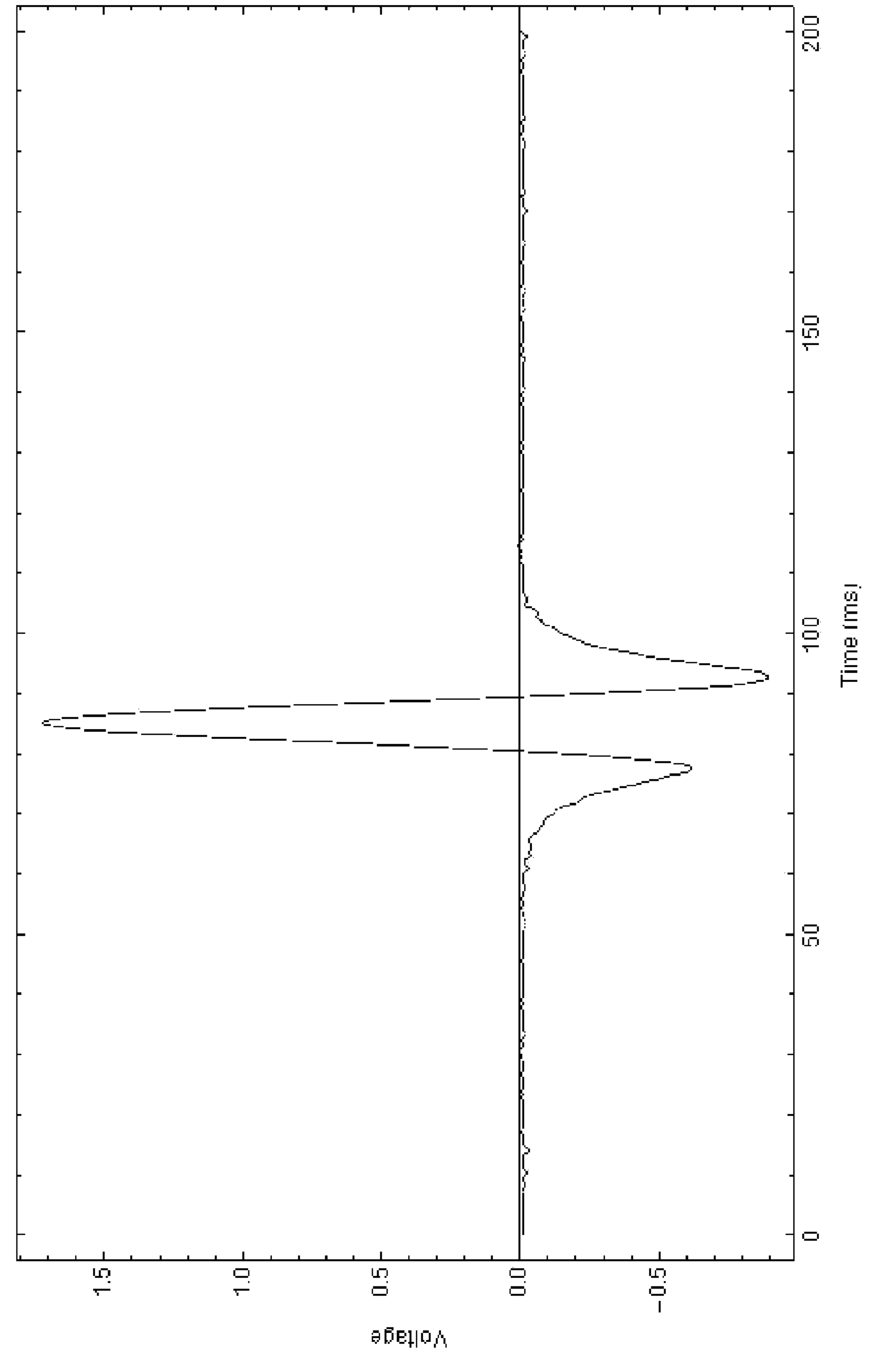
FIG. 16D depicts an exemplary RF signal corresponding to two overlapping monocycles produced by dropping one axially-magnetized magnet down a tube having two coils.

FIG. 16D depicts an exemplary RF signal corresponding to two overlapping monocycles produced by dropping one axially-magnetized magnet down a tube having two coils.

Figure 16E:
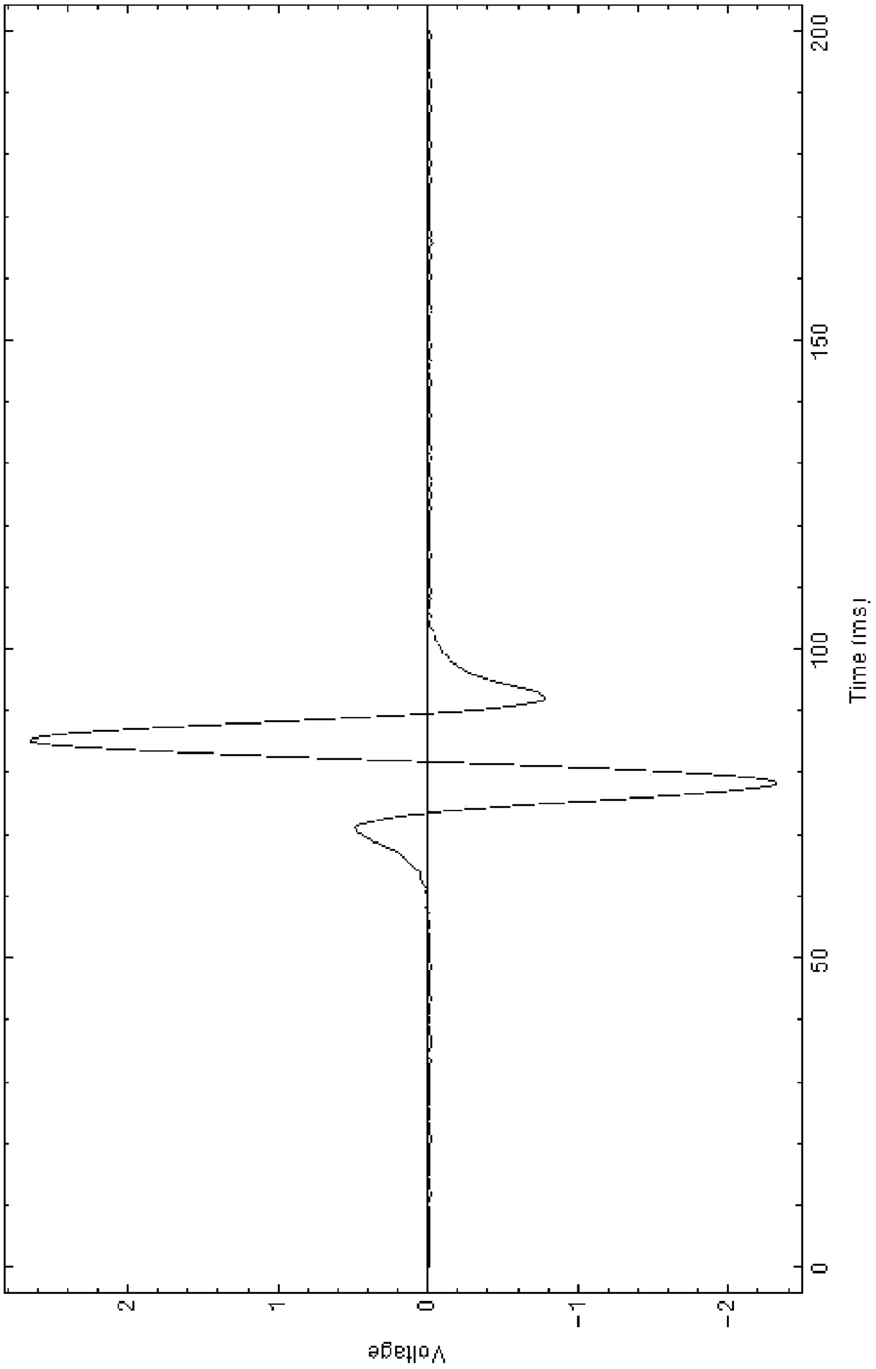
FIG. 16E depicts an exemplary RF signal corresponding to three overlapping monocycles produced by dropping a magnet stack of two axially-magnetized magnets arranged in an alternating polarity-orientation pattern down a tube having two coils.

FIG. 16E depicts an exemplary RF signal corresponding to three overlapping monocycles produced by dropping a magnet stack of two axially-magnetized magnets arranged in an alternating polarity-orientation pattern down a tube having two coils.

Figure 16F:
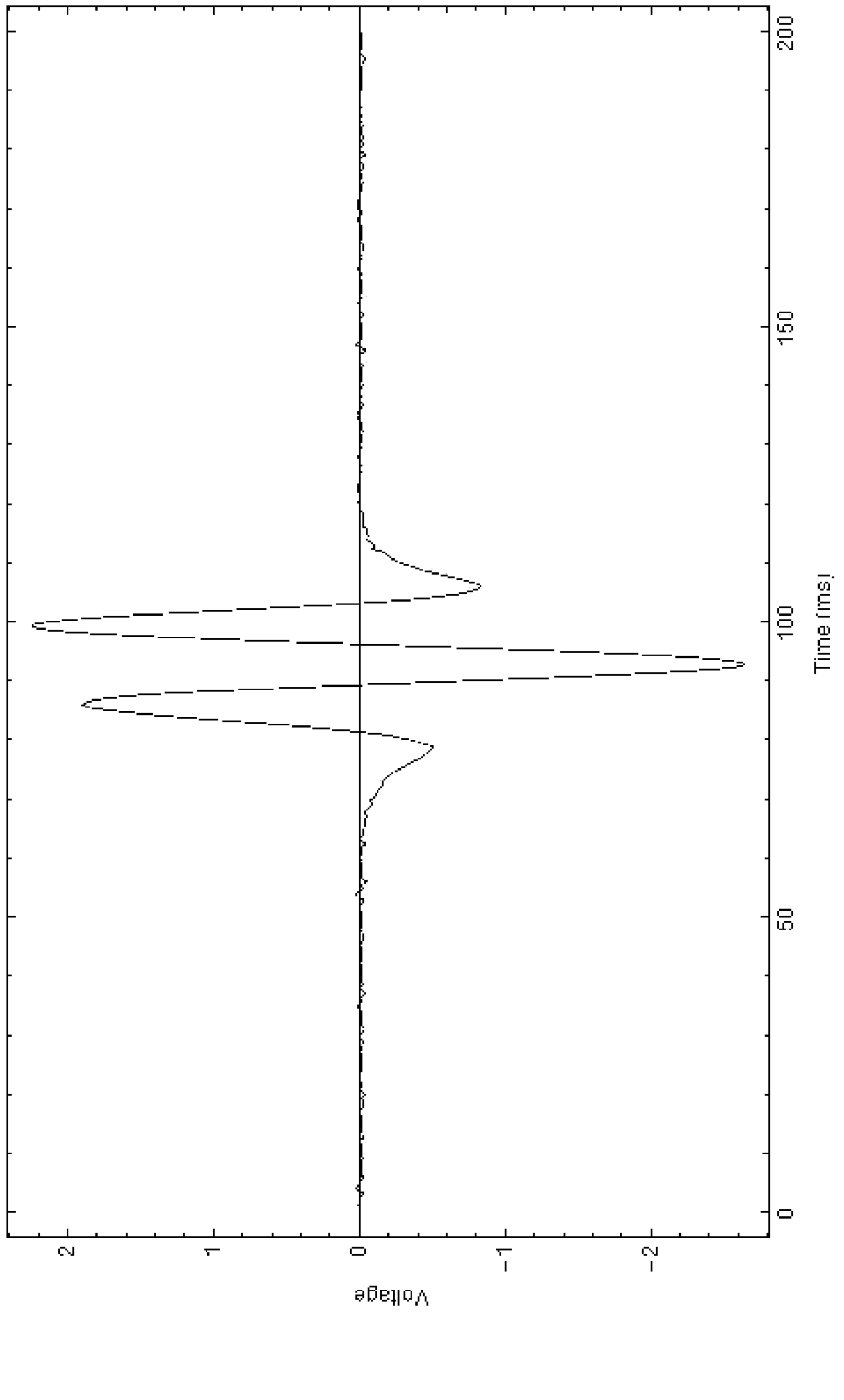
FIG. 16F depicts an exemplary RF signal corresponding to four overlapping monocycles produced by dropping a magnet stack of three axially-magnetized magnets arranged in an alternating polarity-orientation pattern down a tube having two coils.

FIG. 16F depicts an exemplary RF signal corresponding to four overlapping monocycles produced by dropping a magnet stack of three axially-magnetized magnets arranged in an alternating polarity-orientation pattern down a tube having two coils.

Figure 16G:
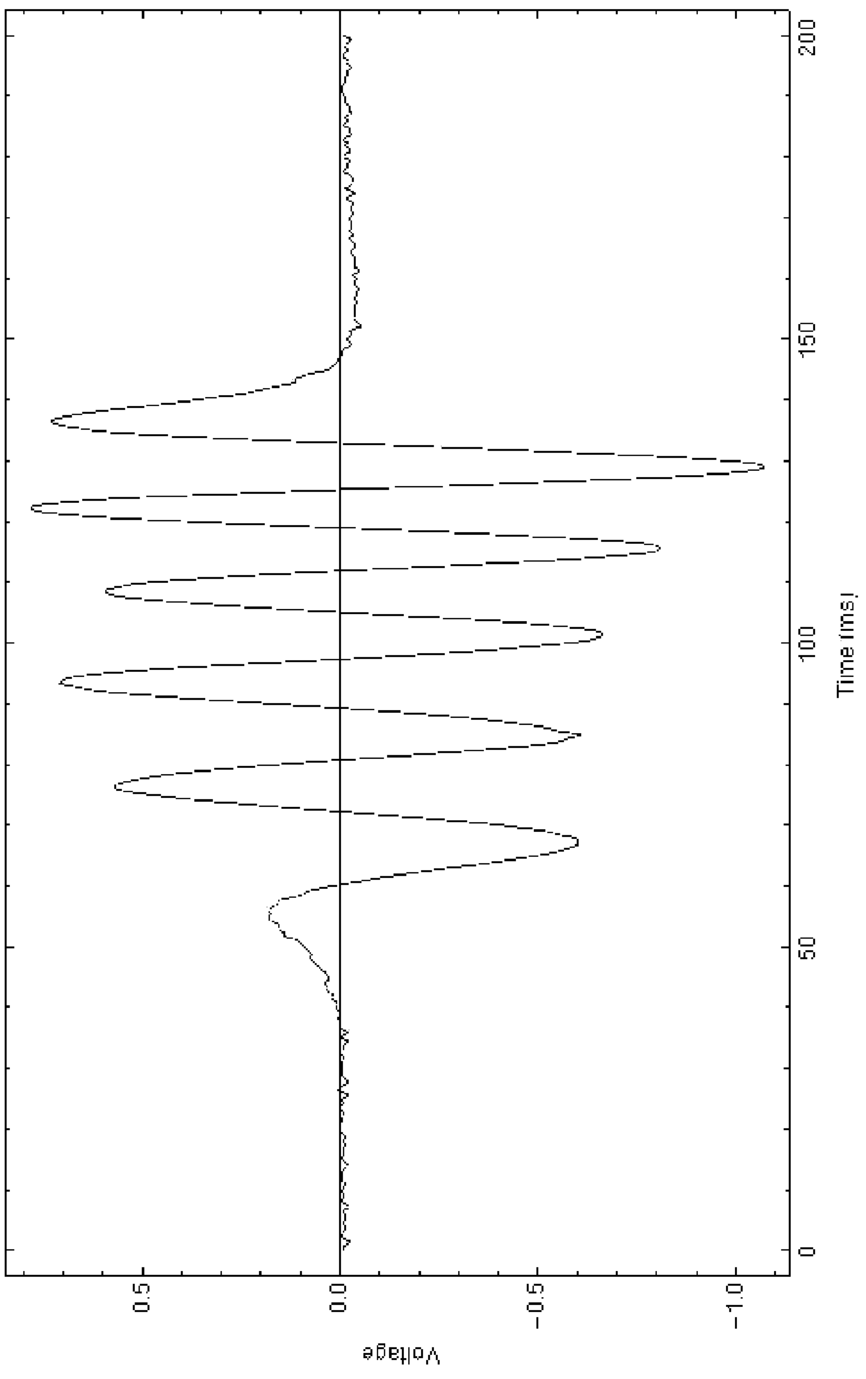
FIG. 16G depicts an exemplary RF signal corresponding to ten overlapping monocycles produced by dropping one axially-magnetized magnet down a tube having one coil.

FIG. 16G depicts an exemplary RF signal corresponding to ten overlapping monocycles produced by dropping one axially-magnetized magnet down a tube having one coil.

Figure 16H:
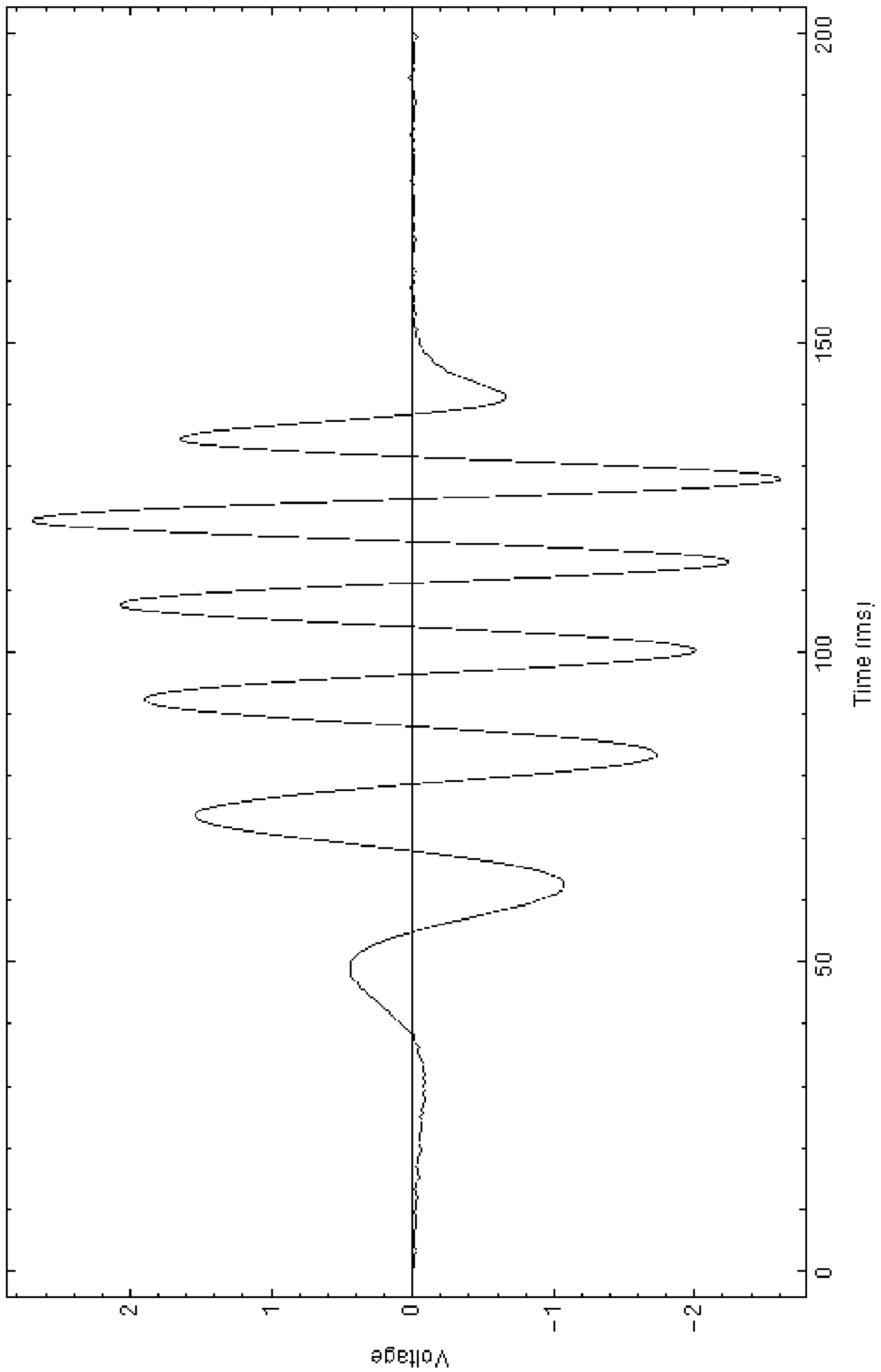
FIG. 16H depicts an exemplary RF signal corresponding to ten overlapping monocycles by dropping a magnet stack of three axially-magnetized magnets arranged in an alternating polarity-orientation pattern down a tube having ten coils.

FIG. 16H depicts an exemplary RF signal corresponding to ten overlapping monocycles by dropping a magnet stack of three axially-magnetized magnets arranged in an alternating polarity-orientation pattern down a tube having ten coils.

Figure 16I:
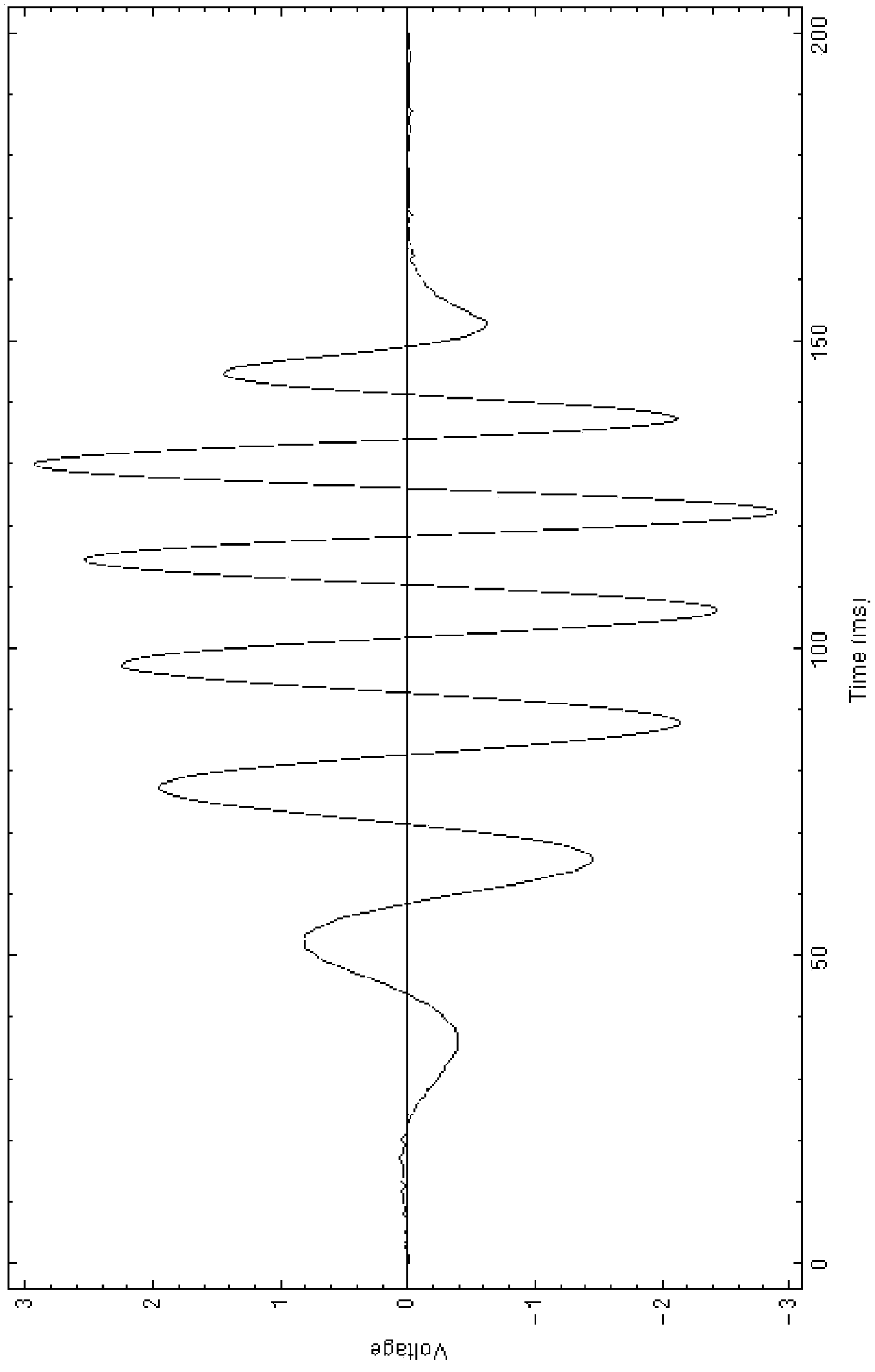
FIG. 16I depicts an exemplary RF signal corresponding to ten overlapping monocycles by dropping a magnet stack of four axially-magnetized magnets arranged in an alternating polarity-orientation pattern down a tube having ten coils.

FIG. 16I depicts an exemplary RF signal corresponding to ten overlapping monocycles by dropping a magnet stack of four axially-magnetized magnets arranged in an alternating polarity-orientation pattern down a tube having ten coils.

Figure 17:
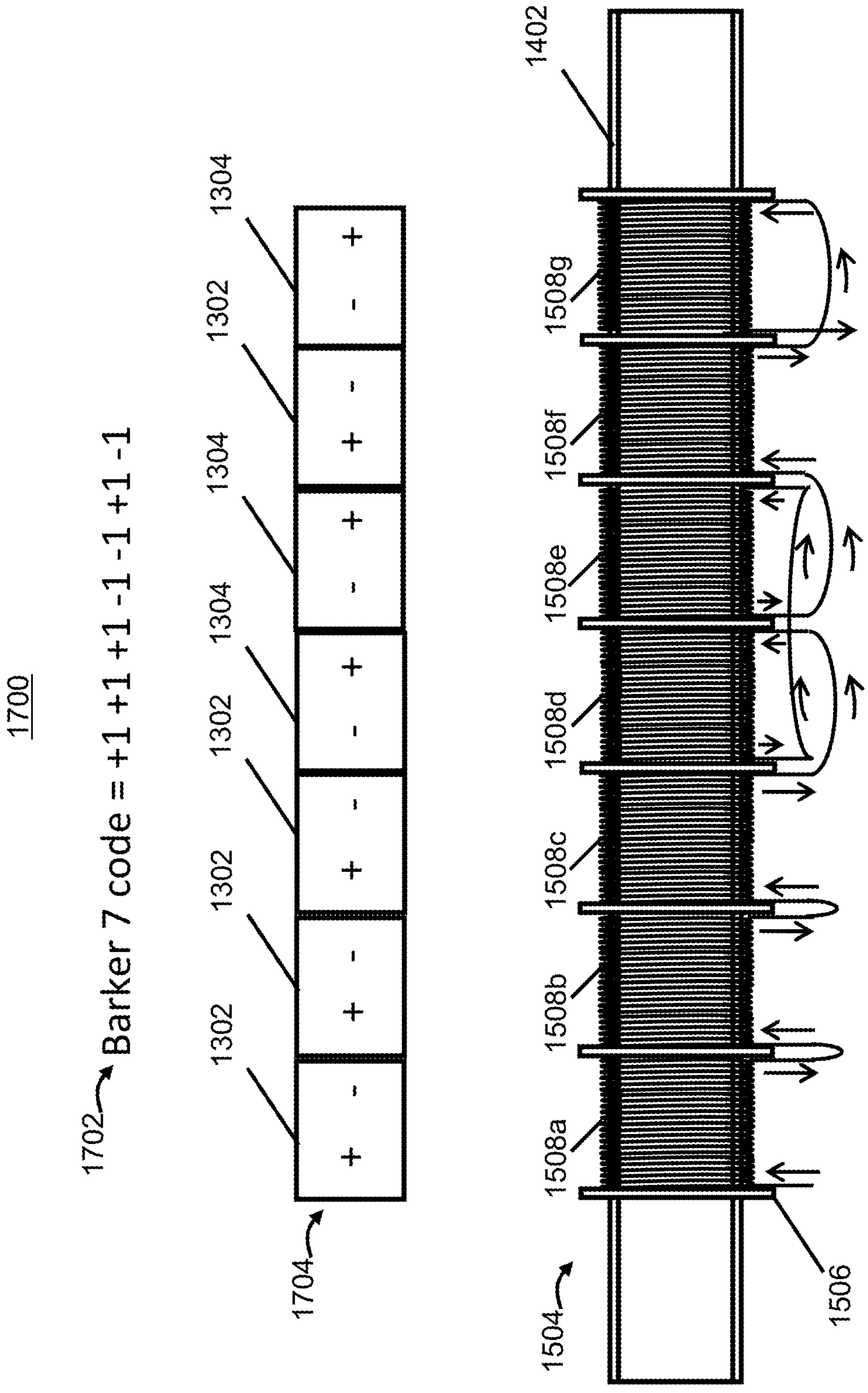
FIG. 17 depicts an exemplary power generation system including a magnet stack of seven axially-magnetized magnets arranged in a Barker 7 coded polarity-orientation pattern and a coil assembly and spacers configured on the outside of a tube within which the magnet stack can be inserted and moved back and forth within the tube.

FIG. 17 depicts a Barker 7 code 1702 and an exemplary power generation system 1700 including a magnet stack 1704 of seven axially-magnetized magnets arranged in a Barker 7 coded polarity-orientation pattern and a moveable magnet assembly 1504 including a coil assembly 1508a-1508g and spacers 1506 configured on the outside of a tube 1402 within which the magnet stack 1704 can be inserted and moved back and forth within the tube 1402. Similar to the coil assembly 1508a-1508g of FIGS. 15A and 15B, the coil assembly of FIG. 17 can be achieved by wrapping (or coiling) wire in the same direction for each coil 1508a-1508g and then connecting the coils in accordance with the Barker 7 code or the direction of coiling the wire could vary in accordance with the Barker 7 code.

Figure 18:
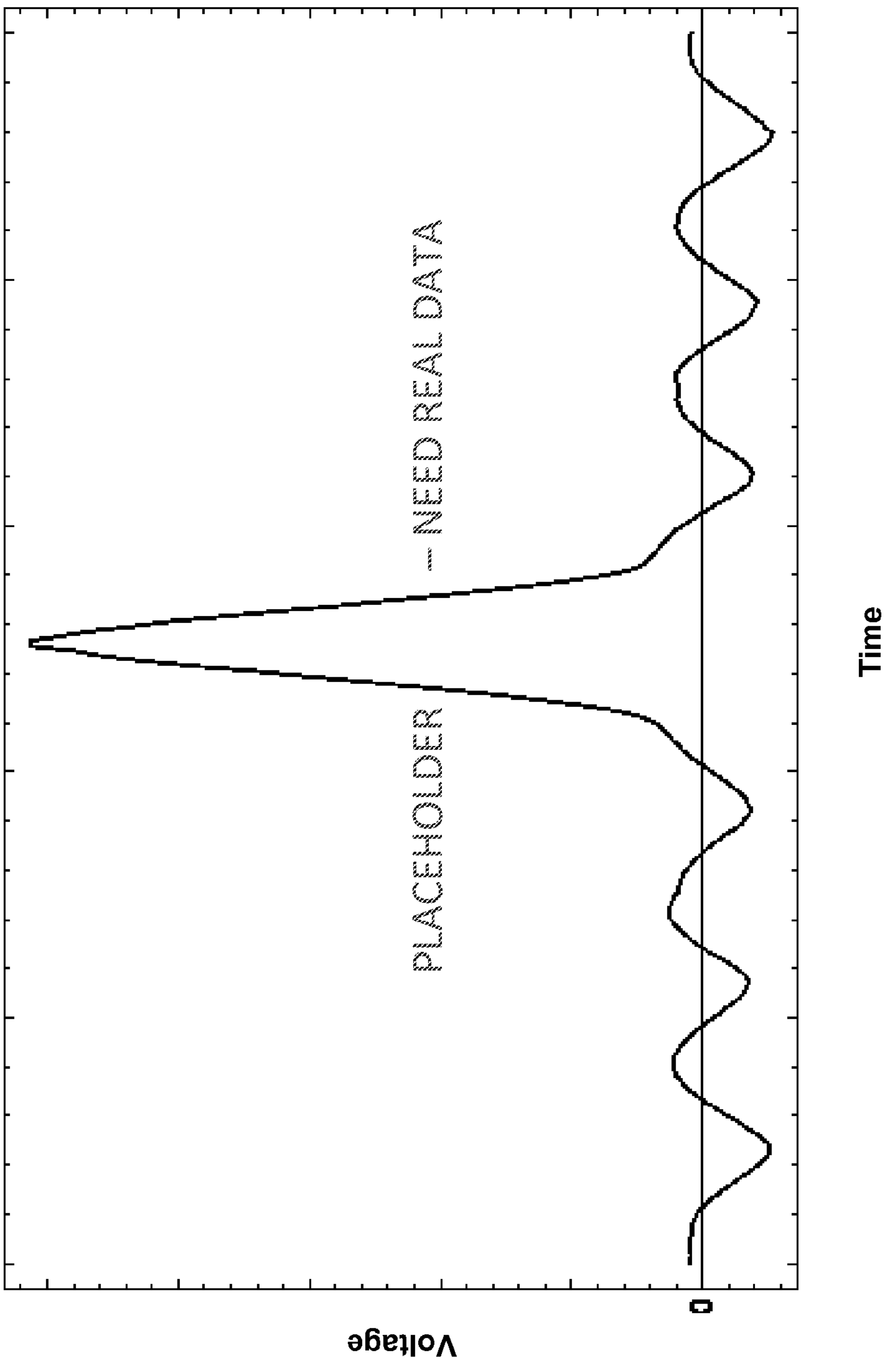
FIG. 18 depicts an exemplary RF signal corresponding to a magnet stack of seven axially-magnetized magnets arranged in a Barker 7 coded polarity-orientation pattern passing entirely through a seven coils wired in accordance with a complementary Barker 7 code.

FIG. 18 depicts an exemplary RF signal corresponding to a magnet stack of seven axially-magnetized magnets arranged in a Barker 7 coded polarity-orientation pattern passing entirely through a seven coils wired in accordance with a complementary Barker 7 code.

Figures 19A, 19B, 19C, 19D:
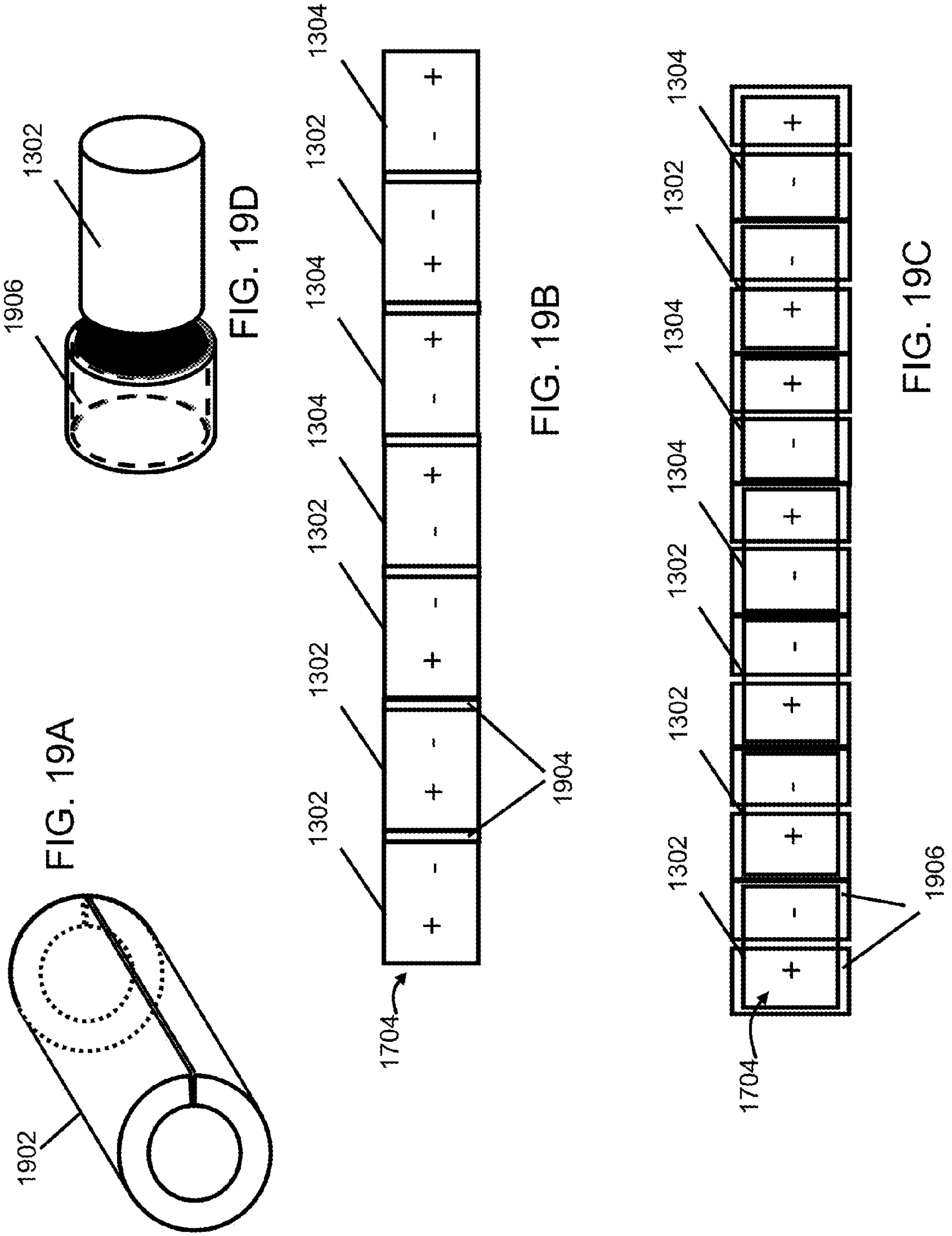
FIG. 19A depicts an exemplary ferromagnetic shield.
FIG. 19B depicts an exemplary ferromagnetic flux circuit.
FIG. 19C depicts another exemplary ferromagnetic flux circuit.
FIG. 19D depicts an oblique projection of the ferromagnetic flux circuit of FIG. 19C about to receive a magnet.

FIG. 19A depicts an exemplary ferromagnetic shield 1902 that can be placed on the outside of a generator of the invention to keep magnetic flux within the generator.

FIG. 19B depicts an exemplary ferromagnetic flux circuit 1904 placed between individual magnets of the magnet structure 1704.

FIG. 19C depicts another exemplary ferromagnetic flux circuit 1906 whereby what appear to be end caps are placed on each end of adjoining magnets of the magnet structure 1704.

FIG. 19D depicts an oblique projection of the ferromagnetic flux circuit 1906 of FIG. 19C about to receive a magnet 1032.

Figure 19E:
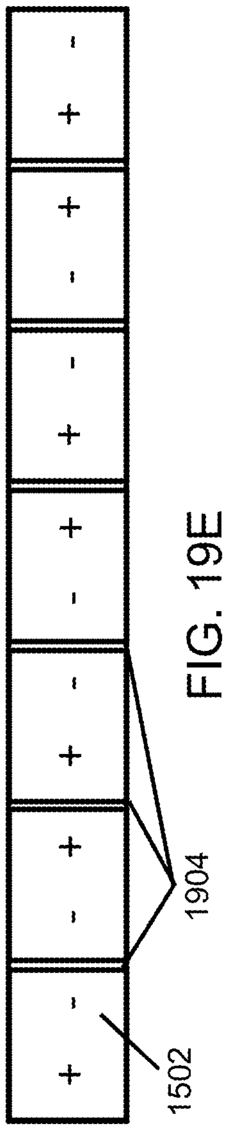
FIG. 19E depicts use of exemplary flux circuits of FIG. 19B between the magnets of the magnetic stack of FIG. 15A.

FIG. 19E depicts use of exemplary flux circuits 1904 of FIG. 19B between the magnets of the magnetic stack 1502 of FIG. 15A.

Figure 19F:
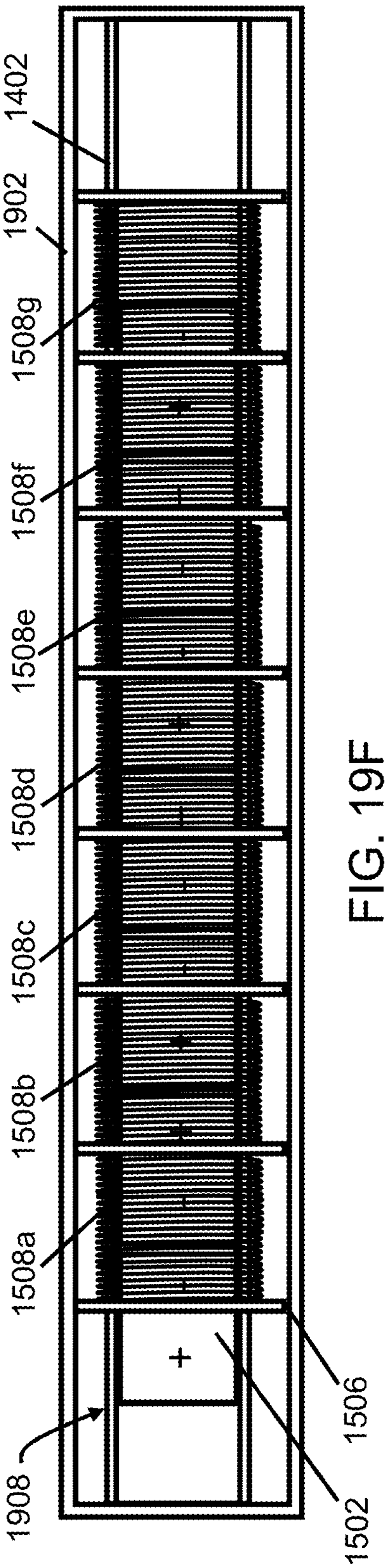
FIG. 19F depicts an exemplary generator having the flux circuits of FIG. 19E, ferromagnetic spacers, and a ferromagnetic shield of FIG. 19A.

FIG. 19F depicts an exemplary generator 1910 having the flux circuits 1904 of FIG. 19E, ferromagnetic spacers 1506, and a ferromagnetic shield 1902 of FIG. 19A, which function together as a magnetic flux circuit. As depicted in FIG. 19F, the generator 1910 includes magnet stack 1502 within a movable magnet assembly 1908 that is much like the movable magnet assembly 1504 of FIG. 15A except the coils 1508a-1508g are resized and spacers 1506 are spaced wider apart about the tube 1402 to accommodate the thickness of the flux circuits 1904 of FIG. 19E. The magnet stack 1502 is shown at a position where the flux circuits 1904 of the magnet stack 1502 are not in alignment with the ferromagnetic spacers 1506 of the moveable magnet assembly 1908.

Figure 19G:
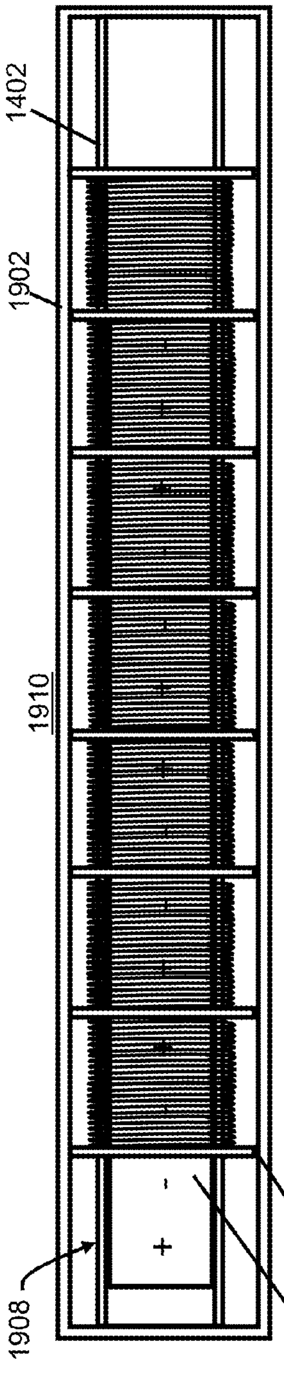
FIG. 19G depicts the generator of FIG. 19A with the magnet stack moved to a first position.

FIG. 19G depicts the generator of FIG. 19A with the magnet stack 1502 moved to a first position, where the six flux circuits 1904 of the magnet stack 1502 align with the leftmost six of the eight ferromagnetic spacers 1506.

Figure 19H:
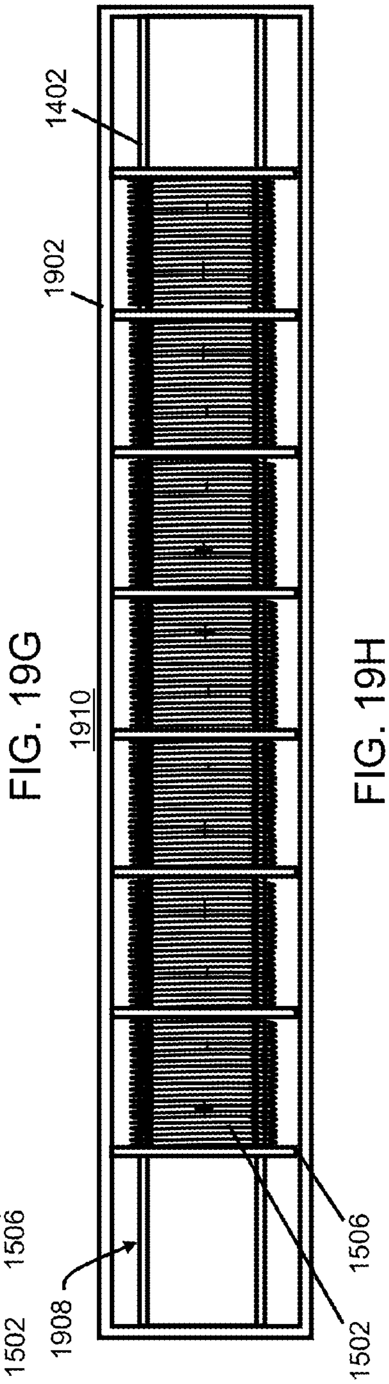
FIG. 19H depict the generator of FIG. 19B with the magnet stack moved to second position.
Figure 19I:
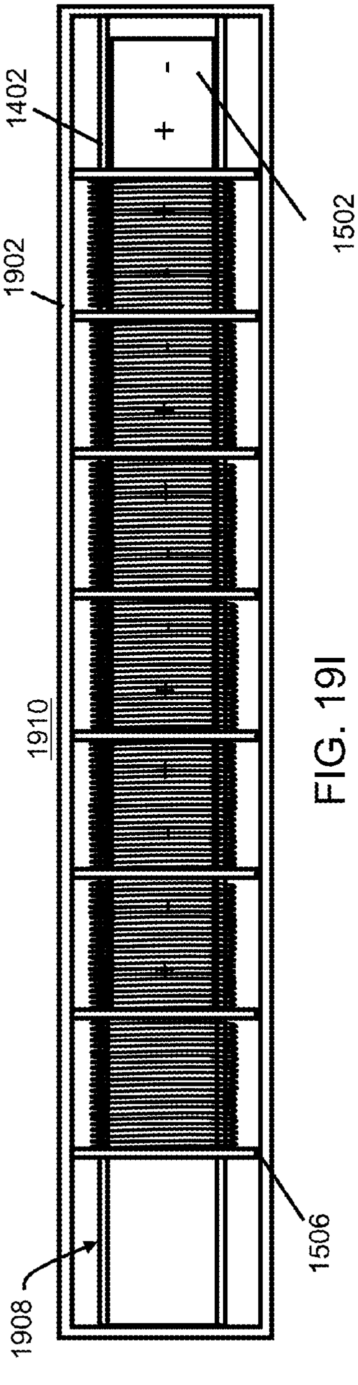
FIG. 19J depicts a cross section of a portion of the magnetic flux circuit of the generator of FIG. 19F.
FIG. 19K depicts a vector field indicating the direction and magnitude of magnetic flux when the ferromagnetic flux circuits between magnets of a magnet stack align with the ferromagnetic spacers of the generator of FIG. 19F.
FIG. 19L depicts the vector field of FIG. 19K overlaying the magnetic flux circuit of FIG. 19J.

FIG. 19H depict the generator of FIG. 19B with the magnet stack moved to second position, where the six flux circuits 1904 of the magnet stack 1502 align with the middle six of the eight ferromagnetic spacers 1506.

FIG. 19G depicts the generator of FIG. 19A with the magnet stack moved to a third position, where the six flux circuits 1904 of the magnet stack 1502 align with the rightmost six of the eight ferromagnetic spacers 1506.

Figure 19J:
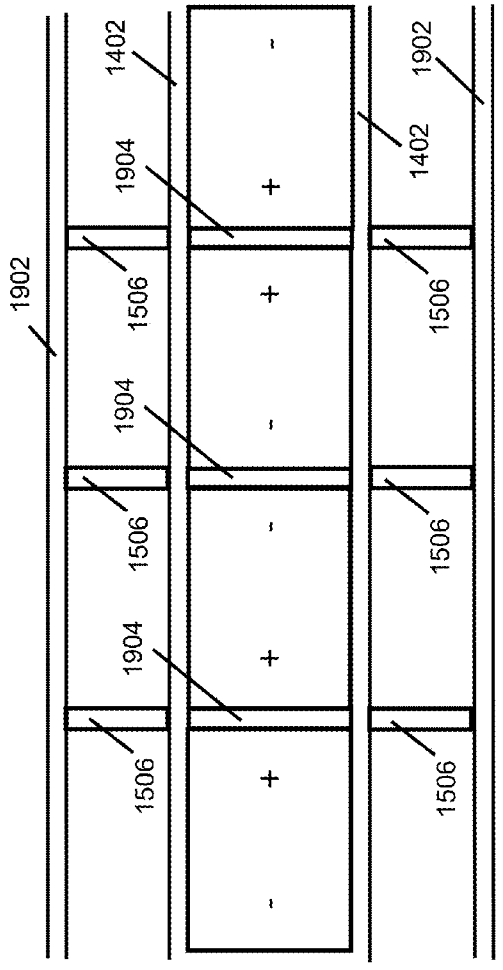

FIG. 19J depicts a cross section of a portion of the magnetic flux circuit of the generator of FIG. 19F. Referring to FIG. 19J, the portion of the magnetic flux circuit consists of the magnetic shield 1902 surrounding the coil assembly and tube 1402, the ferromagnetic spacers 1506 surrounding the tube 1402, and the flux circuits 1904 between the magnets of the magnet stack. When the flux circuits 1904 between the magnets align with the ferromagnetic spacers 1904 a completed magnetic flux circuit is produced.

Figure 19K:
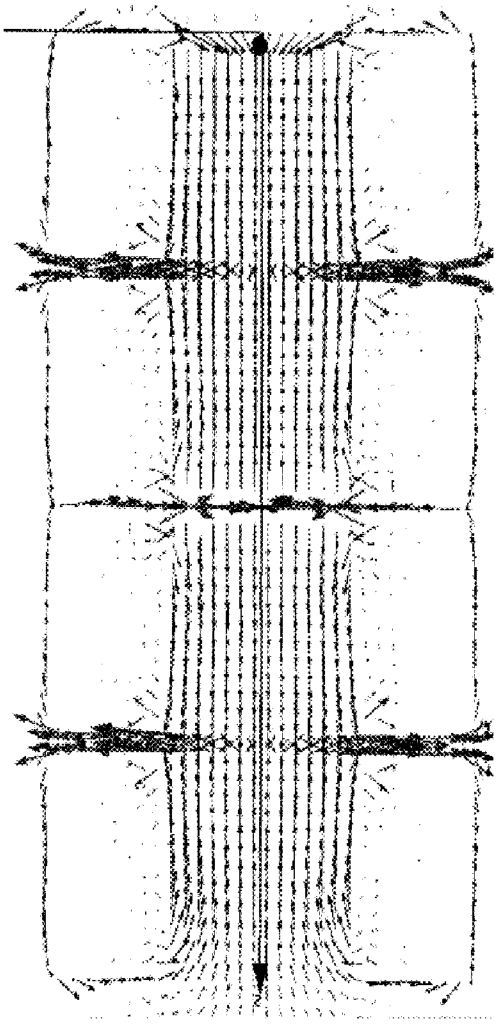

FIG. 19K depicts a vector field indicating the direction and magnitude of magnetic flux when the flux circuits 1904 between magnets of a magnet stack align with the ferromagnetic spacers 1506 of the generator 1910 of FIG. 19F.

Figure 19L:
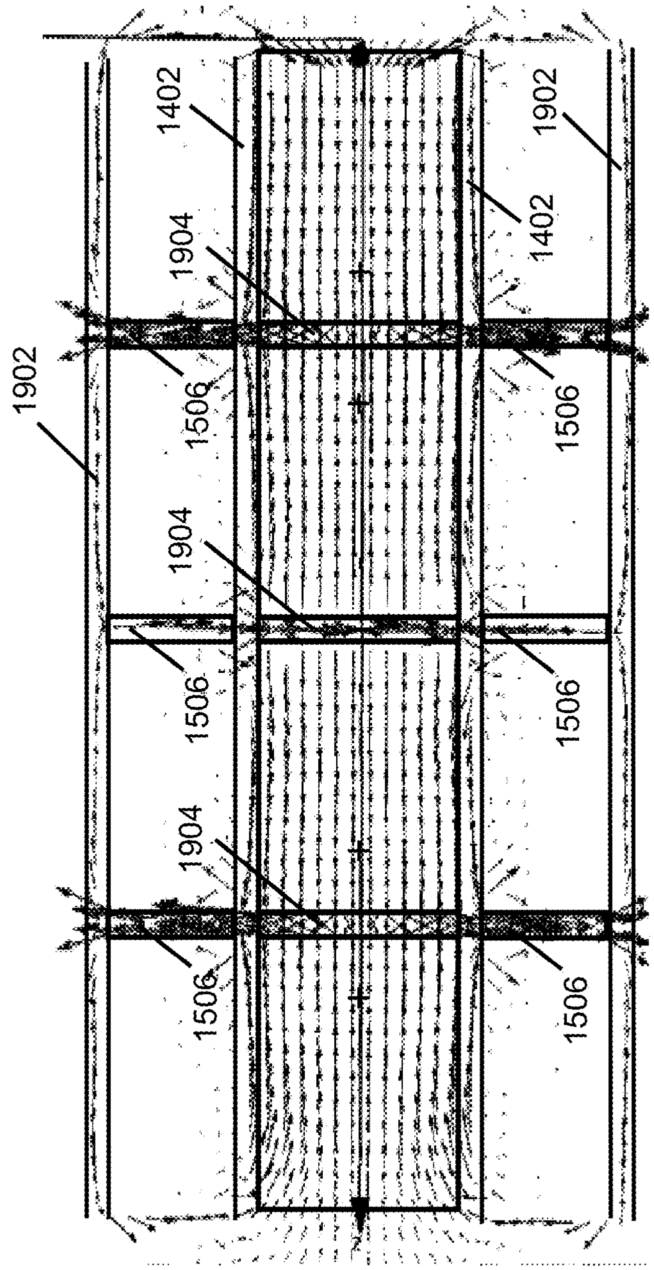

FIG. 19L depicts the vector field of FIG. 19K overlaying the magnetic flux circuit of FIG. 19J.

Figures 20A, 20B, 20C, 21A, 21B, 21C, 21D, 21E:
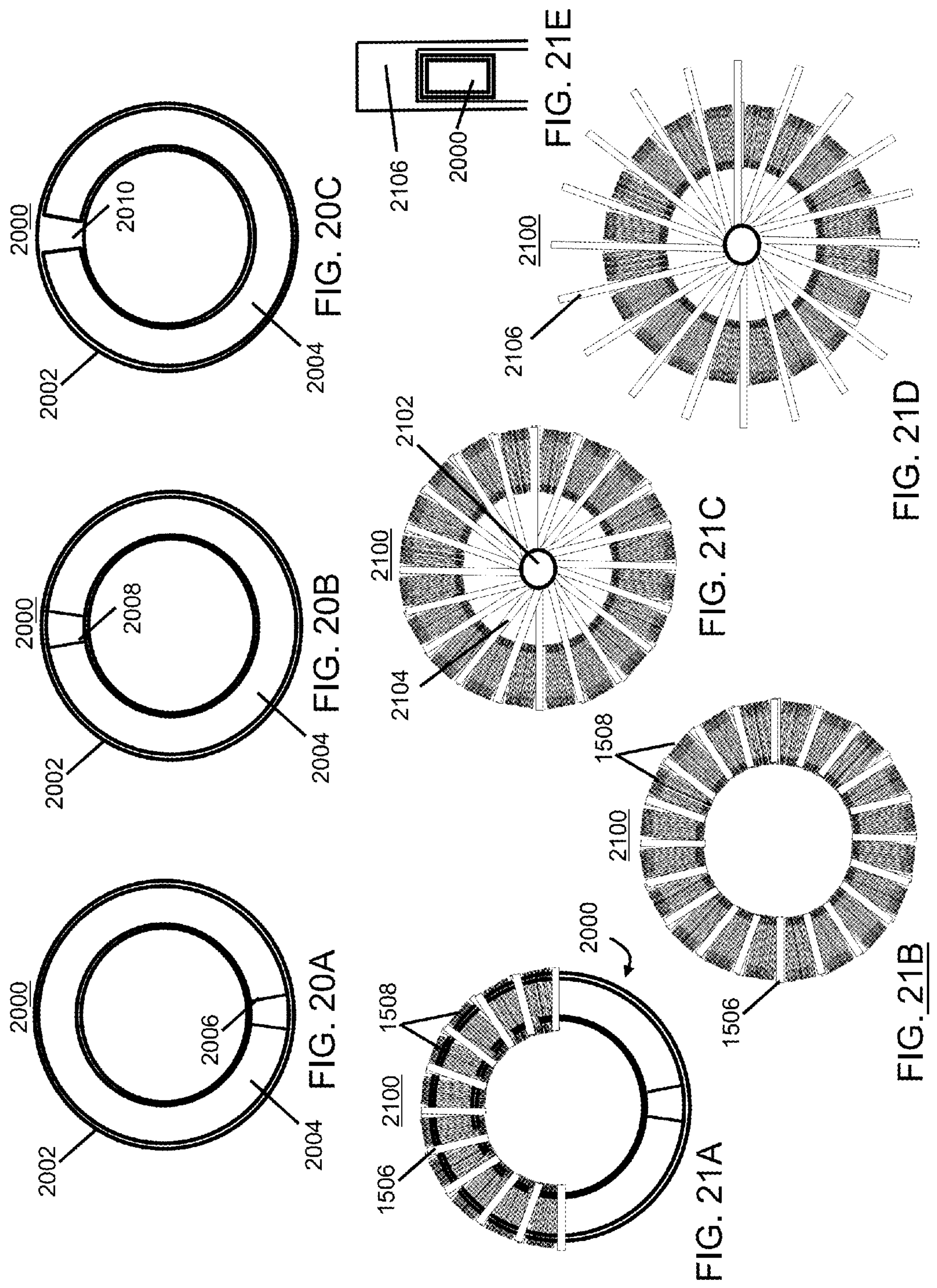
FIG. 20A depicts an exemplary ring-shaped moveable magnet assembly where a circular tube has a partial ring-shaped magnet where the partial ring-shaped magnet is completed with a heavy material that causes the magnet to remain in substantially the same vertical orientation while the outer tube turns relative to the magnet.
FIG. 20B depicts an exemplary ring-shaped moveable magnet assembly where a circular tube has a partial ring-shaped magnet where the ring is completed with a lighter material that would cause the magnet to remain in substantially the same orientation while the outer tube turns relative to the magnet.
FIG. 20C depicts an exemplary ring-shaped moveable magnet assembly where a circular tube has a partial ring-shaped magnet where the magnet will remain in substantially the same orientation while the outer tube turns relative to the magnet.
FIG. 21A depicts an exemplary power generation system including ten coils separated using eleven spacers, where the coils and spacers are configured around the tube of the moveable magnet assembly of FIG. 20A.
FIG. 21B depicts an exemplary power generation system including twenty coils separated using twenty spacers, where the coils and spacers are configured around the tube of the moveable magnet assembly of FIG. 20A.
FIG. 21C depicts an exemplary power generation system including twenty coils separated using twenty spacers, where the coils and spacers are configured around the tube of the moveable magnet assembly of FIG. 20A and where the spacers are extended inward towards an inner axle such that they also function as spokes.
FIG. 21D depicts an exemplary power generation system like the system of FIG. 21C, where the spacers are extended outward towards such that they also function as fins.
FIG. 21E depicts a cross-section of part of the exemplary power generation system of FIG. 21D where the fin portion of the spacer can be seen to extend outward from the moveable magnet assembly.

FIG. 20A depicts an exemplary ring-shaped moveable magnet assembly 2000 where a circular tube 2002 has a partial ring-shaped magnet 2004 where the partial ring-shaped magnet 2004 is completed with a heavy material 2006 that causes the magnet 2004 to remain in substantially the same vertical orientation while the outer tube 2002 turns relative to the magnet 2004.

FIG. 20B depicts an exemplary ring-shaped moveable magnet assembly 2000 where a circular tube 2002 has a partial ring-shaped magnet 2004 where the partial ring-shaped magnet 2004 is completed with a lighter material 2008 that causes the magnet 2004 to remain in substantially the same vertical orientation while the outer tube 2002 turns relative to the magnet 2004.

FIG. 20C depicts an exemplary ring-shaped moveable magnet assembly 2000 where a circular tube has a partial ring-shaped magnet 2004 where the magnet 2004 will remain in substantially the same orientation while the outer tube turns relative to the magnet. As such, as space between two ends of the magnet 2004 would provide stability to the magnet when in a vertical orientation.

FIG. 21A depicts an exemplary power generation system 2100 including ten coils 15080 separated using eleven spacers 1506, where the coils 1508 and spacers 1506 are configured around the tube 2002 of the moveable magnet assembly 2000 of FIG. 20A.

FIG. 21B depicts an exemplary power generation system 3200 including twenty coils 5008 separated using twenty spacers 1506, where the coils and spacers are configured around the tube of the moveable magnet assembly of FIG. 20A.

FIG. 21C depicts an exemplary power generation system including twenty coils separated using twenty spacers, where the coils and spacers are configured around the tube of the moveable magnet assembly of FIG. 20A and where the spacers 1506 are extended inward towards an inner axle 2102 such that they also function as spokes 2104.

FIG. 21D depicts an exemplary power generation system 2100 like the system of FIG. 21C, where the spacers are extended outward towards such that they also function as fins 2106.

FIG. 21E depicts a cross-section of part of the exemplary power generation system 2100 of FIG. 21D where the fin 2106 of the spacer can be seen to extend outward from the moveable magnet assembly 2000.

Figure 22:
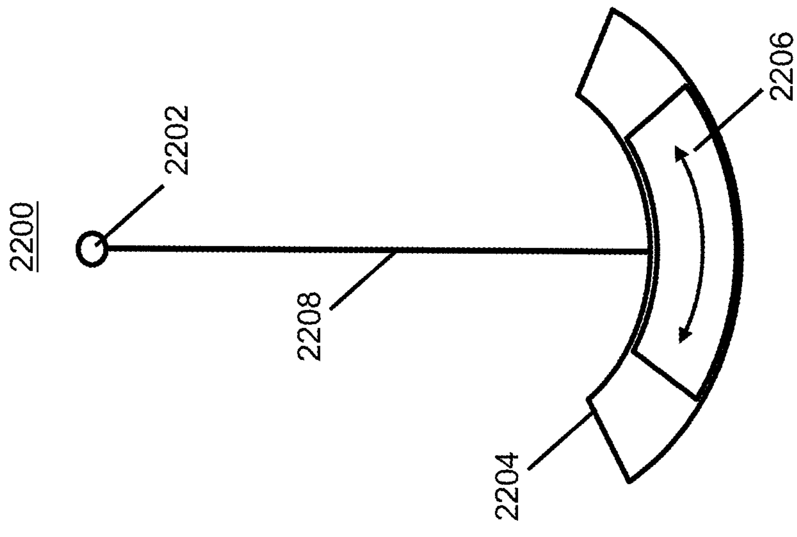
FIG. 22 depicts an exemplary pendulum type moveable magnet assembly including an arch-shaped tube and an arch-shaped magnet structure.

FIG. 22 depicts an exemplary pendulum type moveable magnet assembly 2200 including an arch-shaped tube 2204 and an arch-shaped magnet structure 2206 where the moveable magnet assembly 2200 extends from a pivot point 2202 by an armature 2208.

Figure 23:
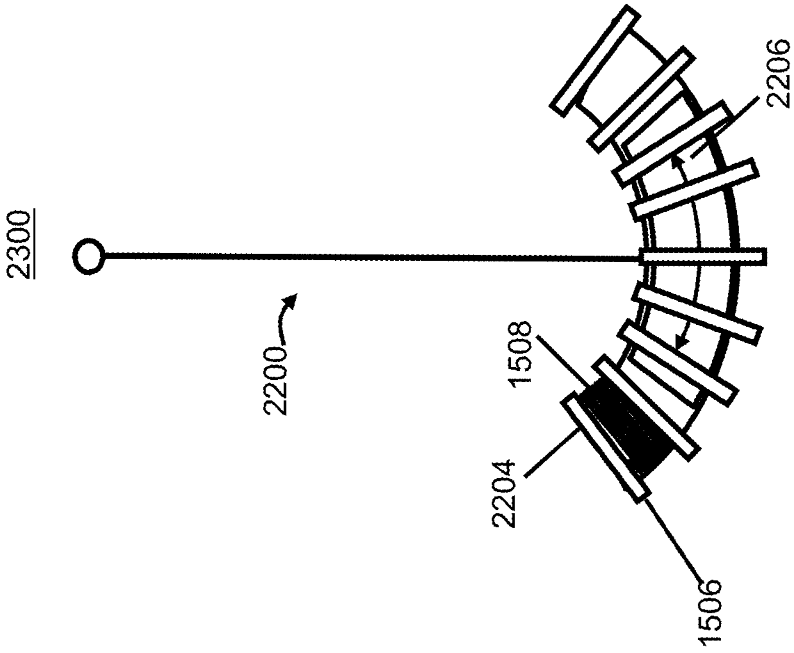
FIG. 23 depicts an exemplary power generation system whereby spacers and coils (only one coil shown for clarity) are configured around the arch-shaped tube of the moveable magnet assembly of FIG. 22.

FIG. 23 depicts an exemplary power generation system 2300 whereby spacers 1506 and coils 1508 (only one coil shown for clarity) are configured around the arch-shaped tube of the moveable magnet assembly of FIG. 22.

Figure 24A:
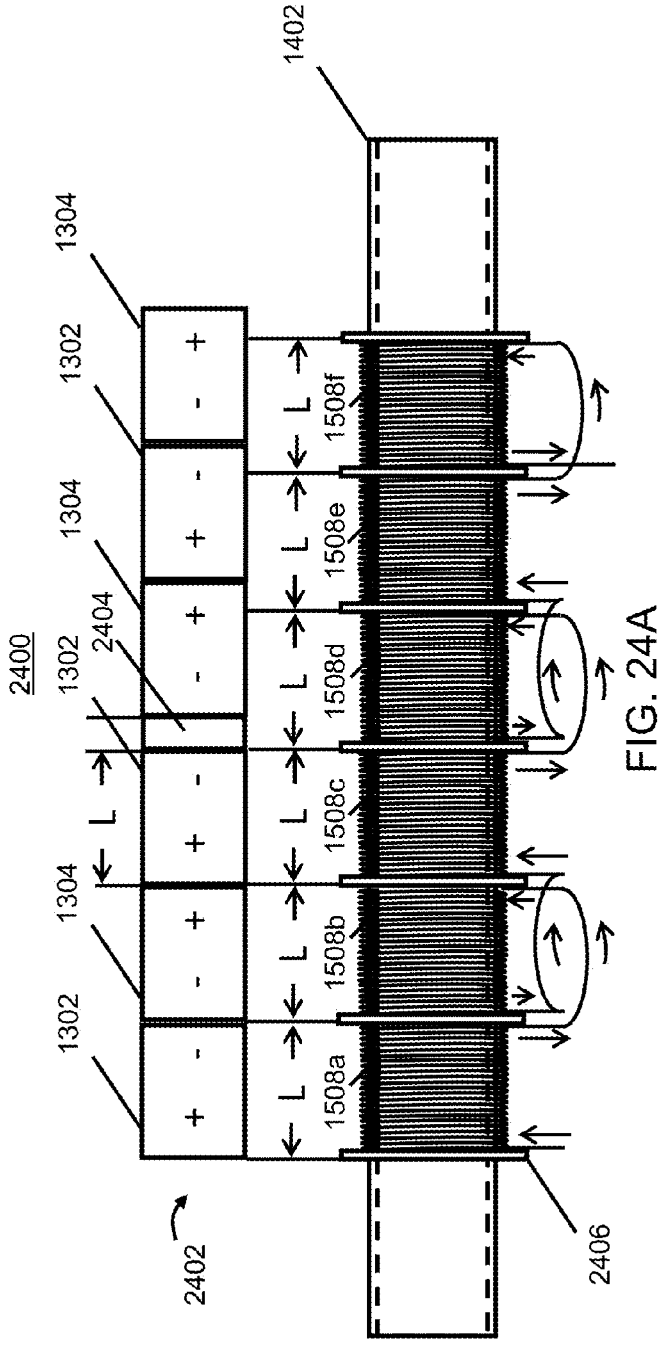
FIGS. 24A-24B depicts an exemplary IQ power generation system in accordance with the invention.
Figure 24B:
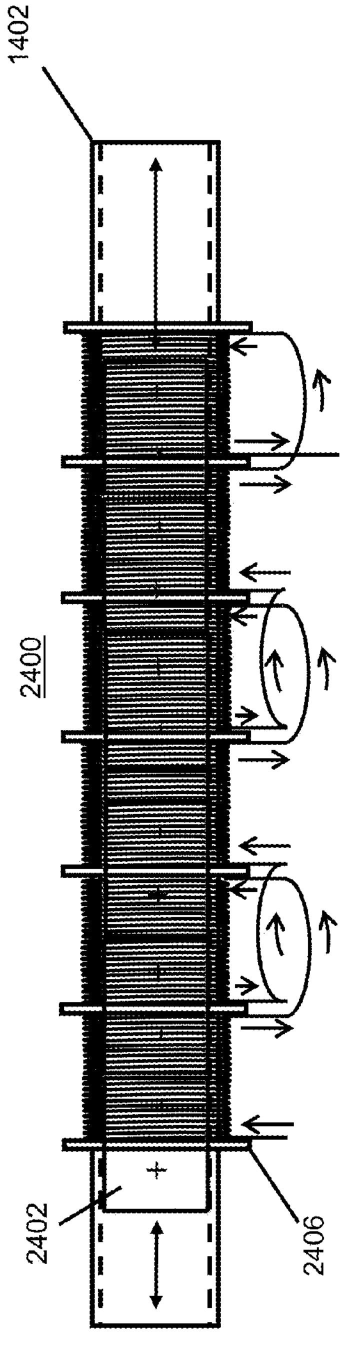

FIGS. 24A-24B depicts an exemplary IQ power generation system 2400 in accordance with the invention. Referring to FIGS. 24A and 24B, inphase and quadrature power generation system 2400 includes a magnetic structure 2402 consisting of a first group of three magnets 1302 1304 1302, a spacer 2404, and a second group of three magnets 1304 1302 1304. The width of the spacer 2404 is one quarter the length of the magnets such that the first group of magnets is 90° out of phase with the second group of magnets. The system 2400 also includes a moveable magnet assembly including a tube 1402 and six coils 1508*a*-1508*f* having wiring corresponding to the polarity orientations of the six magnets making up the magnetic structure 2402. As such, as the magnetic structure 2402 moves back and forth inside the tube 1402 constant power is generated.

Figures 25A, 25B:
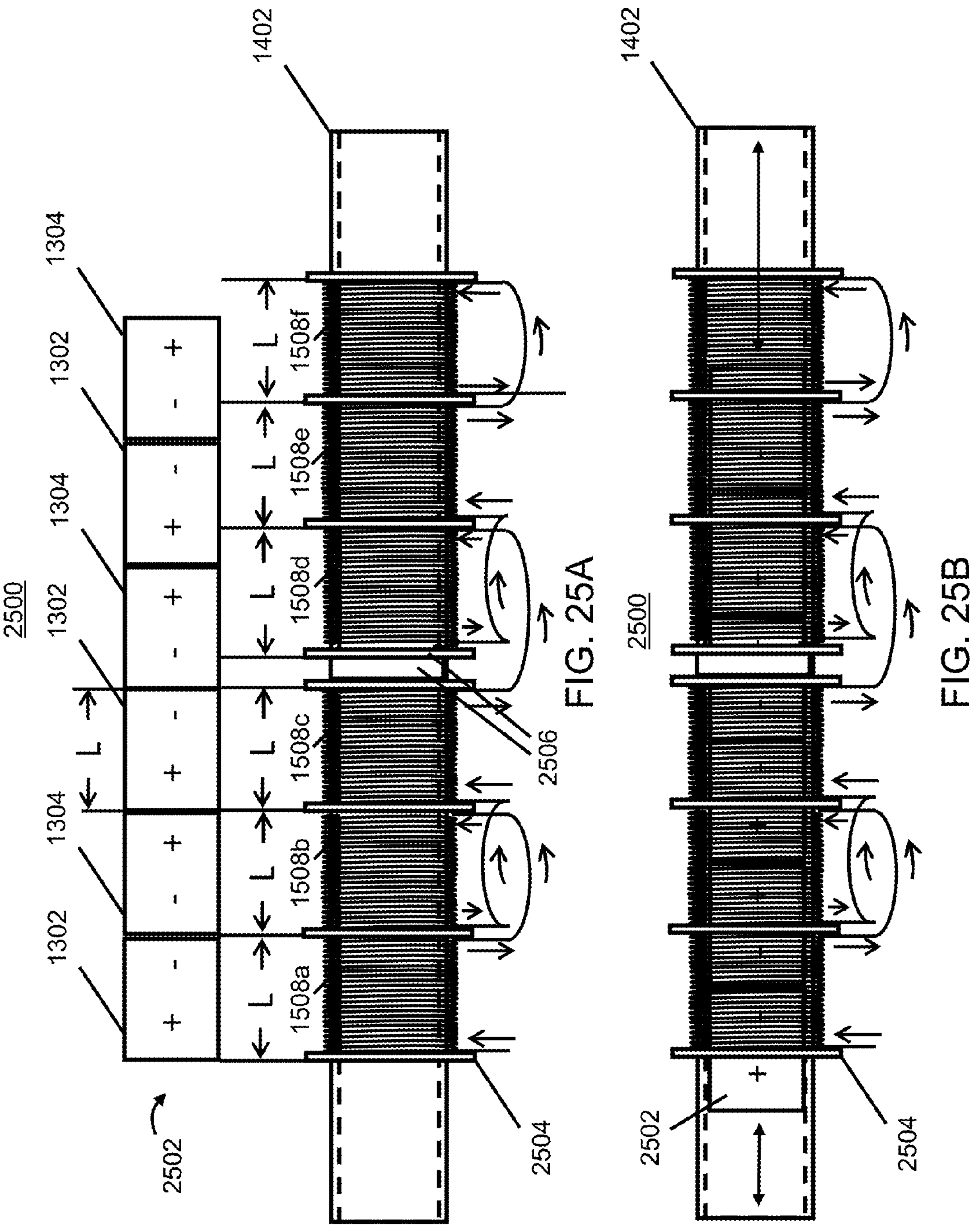
FIGS. 25A-25B depicts another exemplary IQ power generation system in accordance with the invention.

FIGS. 25A-25B depicts another exemplary IQ power generation system 2500 in accordance with the invention, which operates the same as the system 2400 of FIGS. 24A-24B except the spacer is between the coils making up the moveable magnet assembly instead of the magnets making up the magnetic structure. Referring to FIGS. 25A and 25B, inphase and quadrature power generation system 2500 includes a magnetic structure 2502 consisting of a six magnets 1302 1304 1302 1304 1302 1304. The system 2500 also includes a moveable magnet assembly including a tube 1402 and six coils 1508*a*-1508*f* having wiring corresponding to the polarity orientations of the six magnets making up the magnetic structure 2502, where the first three coils are separated from the second three coils by two additional spacers 2506 having a total width of one quarter the length of a magnet (1302 or 1304). As such, as the magnetic structure 2502 moves back and forth inside the tube 1402 constant power is generated.

Different spacings between the magnets making up the magnetic structure and/or between the coils can be employed to produce IQ generation system, three phase power, or other power characteristics.

Various power storage and transfer techniques can be used in accordance with the invention and that many different types of electrical connectors, and the like can be used to meet specific application requirements.

Various well known methods can be used to capture and store energy generated by the generators of the current invention. However, such methods are not generally efficient. As such, in a preferred embodiment of the present invention more efficient methods for capturing and storing energy are employed. Under one arrangement, Because simple diode capture of energy from a generator is inefficient from both an energy standpoint (i.e., energy in vs. stored energy) and from an energy density standpoint (i.e., amount of energy generated per unit volume), and because the generators of the present invention may typically involve low quality energy sources, the present invention lends itself to the use of techniques that increase efficiency of energy capture and energy consumption.

In order to achieve maximum efficiency of the energy capture and consumption processes, techniques can be employed that involve switching from voltage to current and back to voltage. More specifically, the generator of the invention can be modeled as a Thevenin Theorem equivalent circuit comprising a voltage source connected in series with a resistance where the Thevenin Theorem equivalent circuit is a combination of the contributions of such things as the wire resistance of the wire used, flux leakage of the magnetic circuit, losses in the core material (if used), etc. The resistance of this circuit can be determined by measuring the open circuit voltage and dividing that value by the short circuit current. In accordance with the Maximum Power Transfer Theorem, by loading the Thevenin Theorem equivalent circuit with the determined resistance, maximum power transfer can be achieved which corresponds to one half of the generated power at maximum energy density. Higher energy efficiency by lowering the energy density by making a generator larger. As such, the determined resistance (or load) can be considered the upper end of a tradeoff bracket corresponding to a maximum energy density and 50% energy efficiency. By lowering the load (i.e., increasing its resistance or consuming less power) energy efficiency greater than 50% can be achieved at the expense of energy density. Similarly, less energy density enables increased resonance characteristics. As such, engineering trades can be made.

In accordance with one aspect of the invention, real time engineering trades are made to optimize both energy capture and energy use by a load. Specifically, a class D amplifier is connected to a load through an inductor capable of storing the energy of a full cycle of the class D amplifier switch. A memory is used to store a deterministic curve characterizing duty cycle values versus load states and generator frequency. Alternatively, a polynomial or other comparable algorithm can be used to calculate the load state based on generator parameters. A processor can use the stored or calculated duty cycle values to control the duty cycle of the class D amplifier based on measured generator parameters. As such, the optimal generator operating efficiency can be maintained regardless of the rate at which the generator is operated or the state of an attached load. In a similar manner, a class D amplifier can be used to control the rate at which energy is efficiently supplied to a given load. As such, a single processor, class D amplifier, and memory can be used to control efficient energy generation and consumption or two circuits (i.e., two class D amplifiers) can be employed. Several variations of memories, processors, class D amplifiers and the like can be employed to achieve efficient energy generation and/or consumption.

In accordance with another aspect of the invention, a similar class D circuit can be used to transfer energy from one storage unit to another. For example, small generators can store energy in small storage units (e.g., capacitors, batteries, flywheels, etc.) that is collected in a larger storage unit or energy stored in a large storage unit can be distributed to smaller storage units. Thus, in accordance with the invention, energy can be efficiently harvested, stored, and transferred thereby enabling concentration and de-concentration of energy as well as enabling mobility of energy.

In accordance with still another aspect of the invention, the resonance of a generator can be tuned to match the frequency characteristics of an energy source (e.g., the gait of a walking person) or a harmonic thereof.

These efficient energy generation, storage, and consumption methods can be applied to various other energy generation technologies such as solar, wind, thermal electric, galvanic, hydroelectric (including low potential hydroelectric such as a stream), and the like.

The generators disclosed herein can be used with any form of movement to include a person or animal walking (e.g., generator attached to a limb), a fluid flowing (e.g., water or wind), an object being struck (e.g., a soccer ball), an object being turned (e.g., a bicycle pedal mechanism, a hand crank), a shock absorber, and the like. Moreover, multiple generators may be used together relative to the same movement source. For example, multiple generators may be combined as part of a wind turbine or in a water turbine used in a dam.

Various types of anti-friction techniques can be employed between the tubes of the invention and the magnetic structures therein. Furthermore, the tubes and the magnet structures of the invention need not be round but could be any desired shape.

Under one arrangement, a generator of the present invention has a clock that determines an amount of time that a generator has not been moved and after a set amount of time the generator produces an alarm, such as an audible alarm, a RF pulse, optical flash, or the like.

The various generator designs described herein can alternatively be used to design corresponding electric motors. As described for the designs above, for power generation the magnetic structures are moved relative to the coil structures (or vice versa or some combination thereof). However, for motors current can be applied to the coil structures causing either the magnetic structure (or the coil structure to move or some combination thereof). Furthermore, the generator/motor designs also lend themselves for actuators. Inphase and quadrature designs enable substantially controllable actuators whereby movement and positioning can be precisely controlled.

Figure 26A:
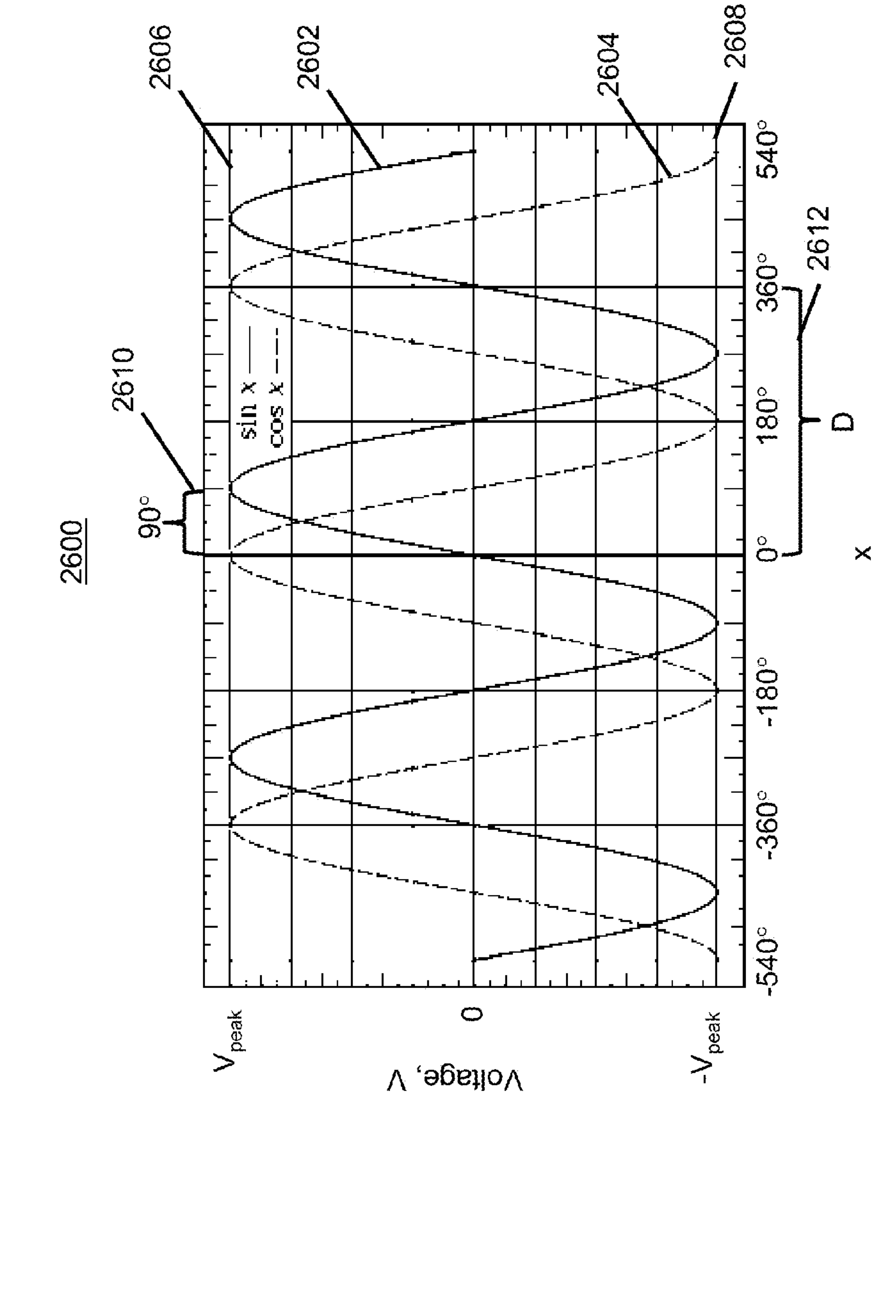
FIGS. 26A and 26B provide a voltage vs. position plot and a control vector rotational plot.
Figure 26B:
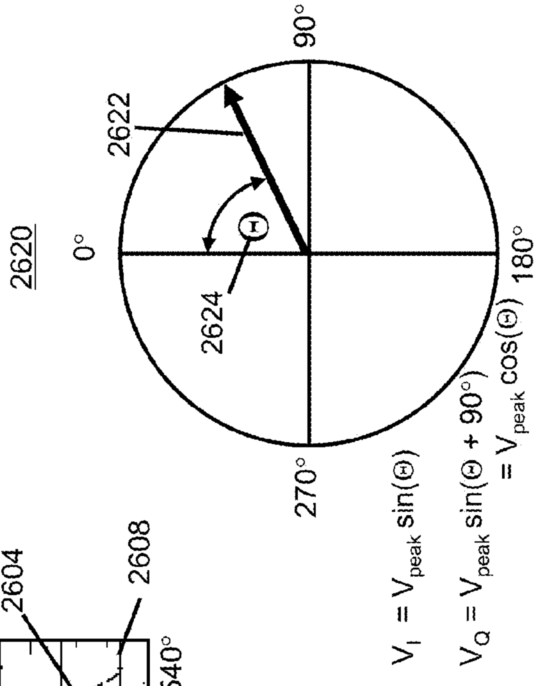

FIGS. 26A and 26B provide a voltage vs. position plot 2600 and a control vector rotational plot 2620. The voltage vs. position plot 2600 depicts the voltage characteristics of two coil structures having an IQ spatial relationship relative to each other and a magnetic structure (e.g., a ring magnetic structure or magnet stack), where a first coil structure is offset spatially by one quarter of a cycle (or 90°) from a second coil structure, which corresponds to one quarter of a distance D that a magnetic structure would travel (i.e., rotationally or linearly) as voltages are applied to the two coil structures for a full rotation of a control vector 2622. As depicted in FIG. 26A, a first control signal 2602 having a first voltage $V_I$ and a second control signal 2604 having a second control voltage $V_Q$ are used to control the relative movement of magnetic structure within an IQ motor or an IQ actuator device. As such, a magnetic structure at a first position 0 will travel (rotationally or translationally) a distance D as the control vector 2622 rotates 360°. For a given control vector rotation Θ 2624, the first control signal 2602 applied to the first coil structure has a voltage of $V_{peak}\sin(\Theta)$ and the second control signal 2604 applied to the second coil structure has a voltage of $V_{peak}\cos(\Theta)$. Because the two control signals 2602 2604 have a phase relationship 2610 of 90°, as the two control signals 2602 2604 vary from a peak positive voltage $V_{peak}$ to a peak negative voltage $-V_{peak}$, the first control signal 2602 achieves its positive or negative peak voltages while the second control signal has zero crossings and vice versa. As a result of the IQ phase relationship of the control signals of the control system, a constant power P is required to cause movement of the magnetic structure of the motor or actuator over the distance D, where $P=(V_I^2+V_Q^2)^{1/2}$. The rate at which the control vector 2622 rotates a full cycle can be described as the IQ driver frequency, which can be sped up or slowed down over time as required to speed up or slow down a motor or actuator in accordance with the invention.

In accordance with an alternative embodiment of the invention, the first and second coil structures of an IQ generator, motor, or actuator are produced by interleaving the two coil structures. Under such an arrangement, spacers may be omitted between coils of the coil structures or may be inserted after the coils have been produced. For example, spacers comprising a comb-like structure could be used where by ferromagnetic teeth or other shape able the structure to penetrate between wires of the coils.

A motor in accordance with the invention may require starting coils, which one can be used to start the motor/r from a dead stop. IQ motors in accordance with the invention may not require starting coils because a desired frequency can be applied to the I/Q driver to producing rotating torque required to bring the motor up to speed.

In accordance with another aspect of the invention, an optional braking/clutch mechanism can be employed with an actuator, whereby the braking/clutch mechanism can be disengaged to allow movement of the magnetic structure of the actuator or engaged to hold a current position. Use of the optional braking/clutch mechanism enables a position of the magnet structure to be maintained without power being provided to the coil structures. A braking/clutch mechanism may be manual and may be magnetic.

In accordance with still another aspect of the invention, a feedback mechanism can be used to provide feedback sufficient to enable an actuator to use a servo motor response to overcome an opposing force. Feedback may be provided by, for example, a linear optical encoder, a linear variable differential transform, or potentiometer.

In accordance with yet another aspect of the invention, various combinations of generators, motors, and/or actuators are possible. For example, a bicycle could have a generator in accordance with the invention configured with a front wheel enabling power to be generated while the wheel turns due to the bike being peddled or the wheel otherwise turning, for example, due to the bike traveling downhill. A motor in accordance with the invention could be configured with the rear wheel enabling power to be applied to the generator in order to turn the rear wheel. The generator and motor could be electrically connected, where there could be a power storage device, and the like. The generator could produce power whenever the front wheel is turning, where the power could be converted to DC and stored in a battery. The motor could draw power from the battery, where the power would be converted to AC, as required. As such, the generators, motors, and/or actuators of the present invention can be used to support efficient travel, efficient automation, and the like.

While particular embodiments of the invention have been described, it will be understood, however, that the invention is not limited thereto, since modifications may be made by those skilled in the art, particularly in light of the foregoing teachings.

The invention claimed is:

1. A electromagnetic structure, comprising:

a rotor assembly comprising:

a circular magnetic structure comprising a magnetizable material that is printable, wherein said circular magnetic structure has opposing first and second surfaces that extend around a peripheral boundary region, said peripheral boundary region having a plurality of printed emission sources, wherein each printed emission source on said magnetizable material presents poles having opposite polarities of a first polarity and a second polarity, wherein adjacent printed emission source have alternating pole orientations such that each printed emission source having said first polarity is between two printed emission sources having said second polarity and each printed emission source having said second polarity is between two printed emission sources having said first polarity; and a rotational element for rotating said circular magnetic structure about a rotation axis that is perpendicular to said opposing first and second surfaces; and at least one stator assembly comprising:

at least one core element that extends from said first surface around to said second surface to magnetically couple said poles of opposite polarities of each respective printed emission source of said plurality of printed emission sources when said rotor is rotated about said rotation axis; and at least one coil winding wound around the at least one core element.

2. The electromagnetic structure of claim 1, wherein said at least one stator assembly comprises a first stator assembly and a second stator assembly, wherein said first stator assembly is positioned relative to said second stator assembly such that when said first stator assembly is substantially aligned with a first emission source having a first state on said first surface, the second stator assembly is substantially aligned with a second printed emission source having a second state on said first surface.

3. The electromagnetic structure of claim 1, wherein said at least one stator assembly comprises a first stator assembly and a second stator assembly, said first stator assembly having a first coil winding and second stator assembly having a second coil winding such that corresponding currents through the first coil winding and the second coil winding have the same direction.

4. The electromagnetic structure of claim 1, wherein said at least one stator assembly comprises a first stator assembly and a second stator assembly, said first stator assembly having a first coil winding and said second stator assembly having a second coil winding, said first stator assembly being positioned relative to said second stator assembly such that corresponding currents through the first coil winding and the second coil winding have an in phase and quadrature phase relationship.

5. The electromagnetic structure of claim 1, wherein the at least one core element comprises:

a coil element portion of a first dimension for winding the at least one coil; and an interface portion of a second dimension positioned closer to the circular magnetic structure than the coil element portion, wherein the first dimension is different from said second dimension.

6. The electromagnetic structure of claim 5, wherein the interface portion has a cross sectional shape in a plane perpendicular to the rotation axis dimensioned to correspond to the shape of a printed emission source.

7. The electromagnetic structure of claim 1 comprising a plurality of circular magnetic structures that are parallel to each other perpendicular to the rotation axis.

8. The electromagnetic structure of claim 5, wherein the circular magnetic structure comprises a circular ring structure having a hollow inner portion relative to the peripheral boundary.

9. The electromagnetic structure of claim 1, further comprising a non-magnetic stator assembly alignment template configured to align the at least stator assembly.

10. The electromagnetic structure of claim 1, wherein the electromagnetic structure comprises at least one of a power generator, a motor or an actuator.

* * * * *